(12) United States Patent
Brockhoff

(10) Patent No.: US 7,669,912 B2
(45) Date of Patent: Mar. 2, 2010

(54) CONVERTIBLE VEHICLE

(75) Inventor: Franz-Ulrich Brockhoff, Bramsche (DE)

(73) Assignee: Wilhelm Karmann GmbH, Osnabrueck ( * ) Notice: Subject to any disclaimer, the term of this patent is extended or adjusted under 35 U.S.C. 154(b) by 378 days.

(21) Appl. No.: 11/568,577

(22) PCT Filed: Apr. 30, 2005

(86) PCT No.: PCT/DE2005/000805

§ 371 (c)(1),
(2), (4) Date: Jul. 5, 2007

(87) PCT Pub. No.: WO2005/105497

PCT Pub. Date: Nov. 10, 2005

(65) Prior Publication Data

US 2008/0258492 A1 Oct. 23, 2008

(30) Foreign Application Priority Data

May 3, 2004 (DE) ........................ 10 2004 021 577

(51) Int. Cl.
*B60J 7/08* (2006.01)
*B60J 7/14* (2006.01)
(52) U.S. Cl. ............. 296/108; 296/107.09; 296/107.16; 296/121
(58) Field of Classification Search ................. 296/108, 296/107.07, 107.08, 107.09, 107.11, 107.15, 296/121
See application file for complete search history.

(56) References Cited

U.S. PATENT DOCUMENTS

| 5,520,432 | A | * | 5/1996 | Gmeiner et al. | ........ 296/107.01 |
| 6,550,842 | B1 | * | 4/2003 | Halbweiss et al. | .......... 296/116 |
| 6,585,310 | B1 | | 7/2003 | Guillez | |
| 6,623,065 | B2 | * | 9/2003 | Halbweiss et al. | .......... 296/122 |
| 6,814,391 | B2 | * | 11/2004 | Biecker et al. | .............. 296/108 |
| 6,843,523 | B2 | * | 1/2005 | Nania | ..................... 296/136.05 |
| 7,344,180 | B2 | * | 3/2008 | Halbweiss et al. | .......... 296/108 |
| 7,594,685 | B2 | * | 9/2009 | Brockhoff | ................. 296/24.44 |
| 2002/0105206 | A1 | * | 8/2002 | Neubrand | .............. 296/107.07 |
| 2002/0185885 | A1 | * | 12/2002 | Biecker et al. | .............. 296/108 |
| 2008/0093880 | A1 | * | 4/2008 | Westermann et al. | .. 296/107.17 |
| 2008/0203758 | A1 | * | 8/2008 | Brockhoff | .............. 296/107.07 |
| 2009/0160207 | A1 | * | 6/2009 | Neubrand | ................ 296/65.01 |

FOREIGN PATENT DOCUMENTS

DE 19706397 C1 6/1998
JP 1111525 A 4/1989

* cited by examiner

*Primary Examiner*—Patricia L Engle
(74) *Attorney, Agent, or Firm*—Quinn Law Group, PLLC.

(57) ABSTRACT

A convertible vehicle is provided with at least two roof elements that are separated from each other at a joint when the roof is in the closed position and arranged one after the other relative to the direction of travel, and in order to open the roof a rear roof element can move at least essentially rearward and downward, and a front roof element can swivel toward the rear roof element. When the roof is open, the C pillars can be swiveled inward in relation to a center section comprising to mediate the swiveling, at least one shaft, which when the roof is closed has at least one component in the direction of travel and one upwardly directed component, and whose rotary movement in the region of the joint between the roof elements can be translated into a swivel movement between them.

11 Claims, 30 Drawing Sheets

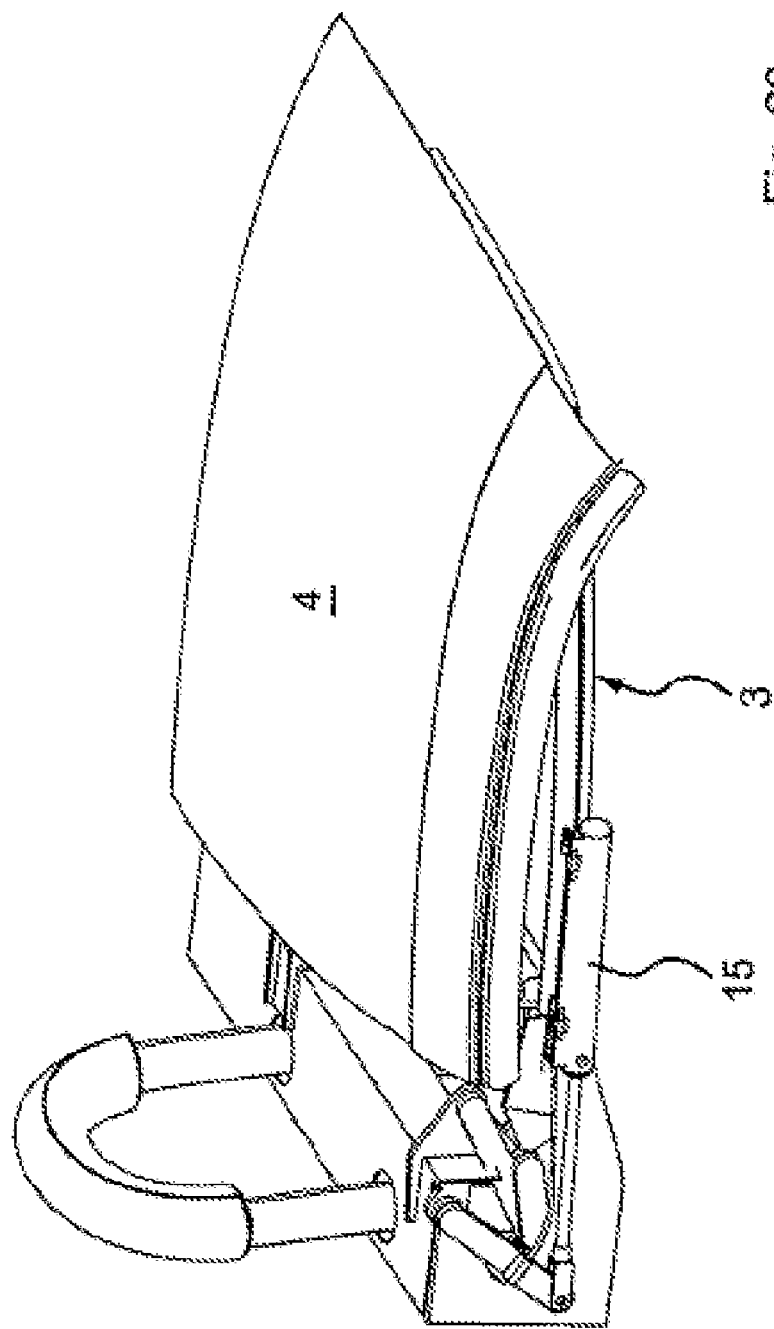
Fig. 20
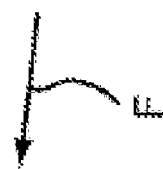

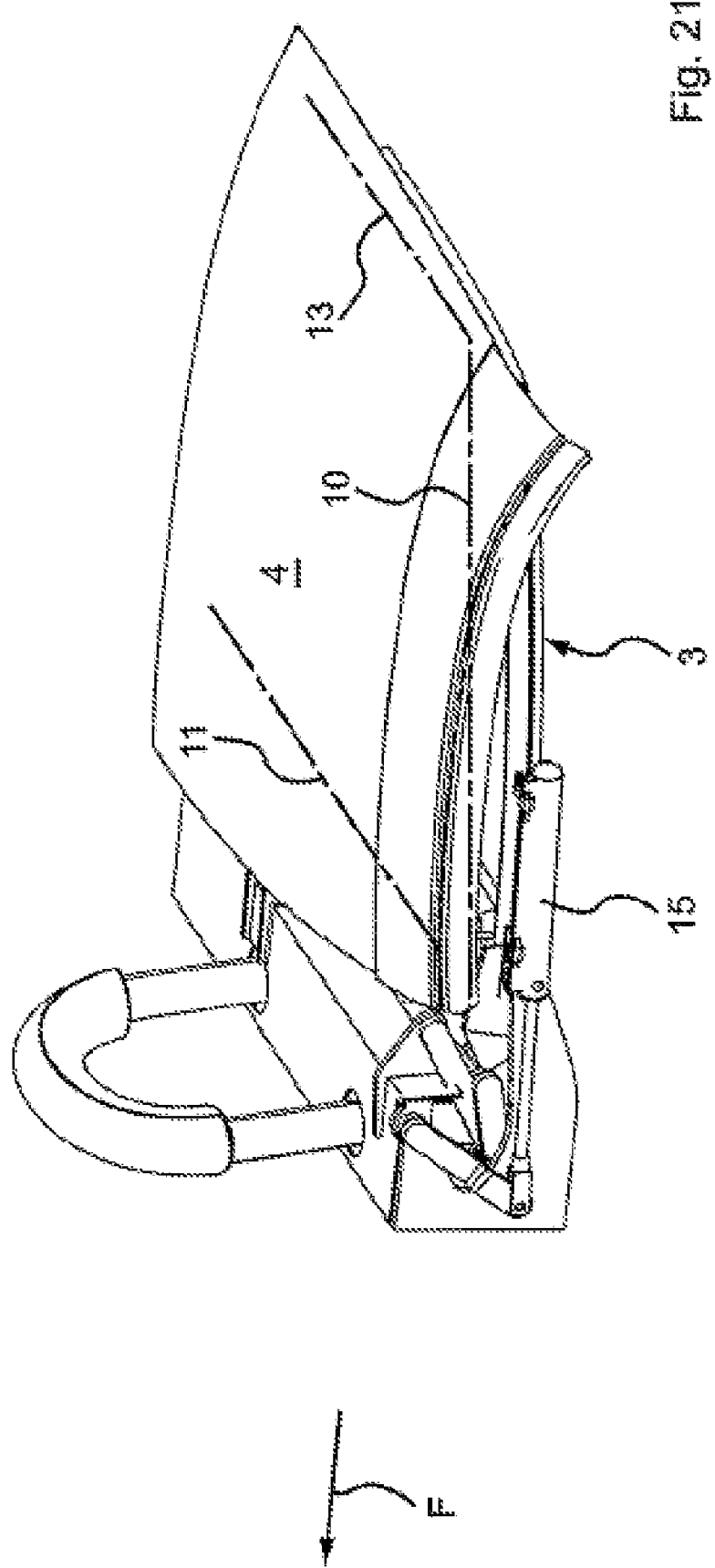

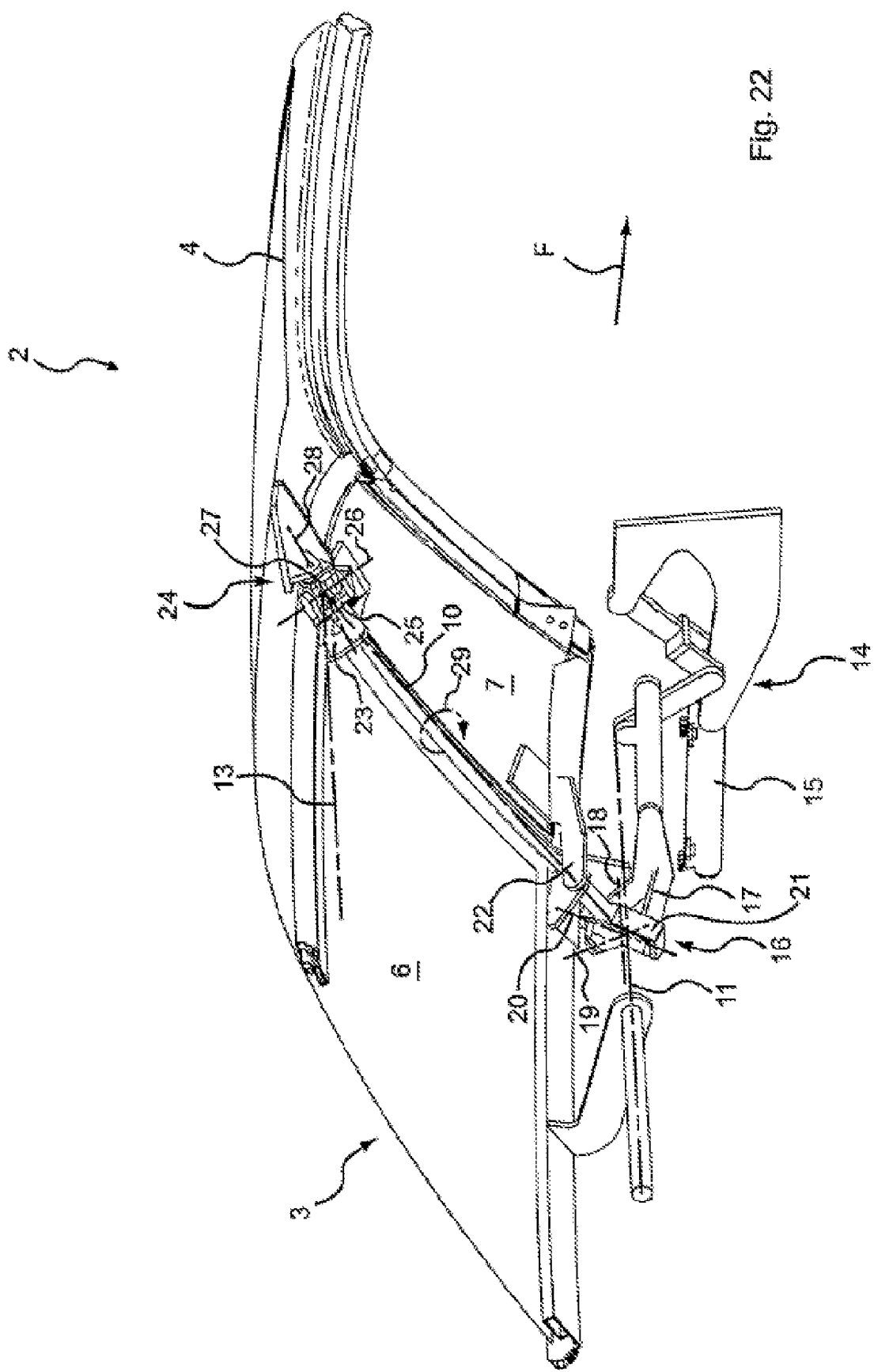

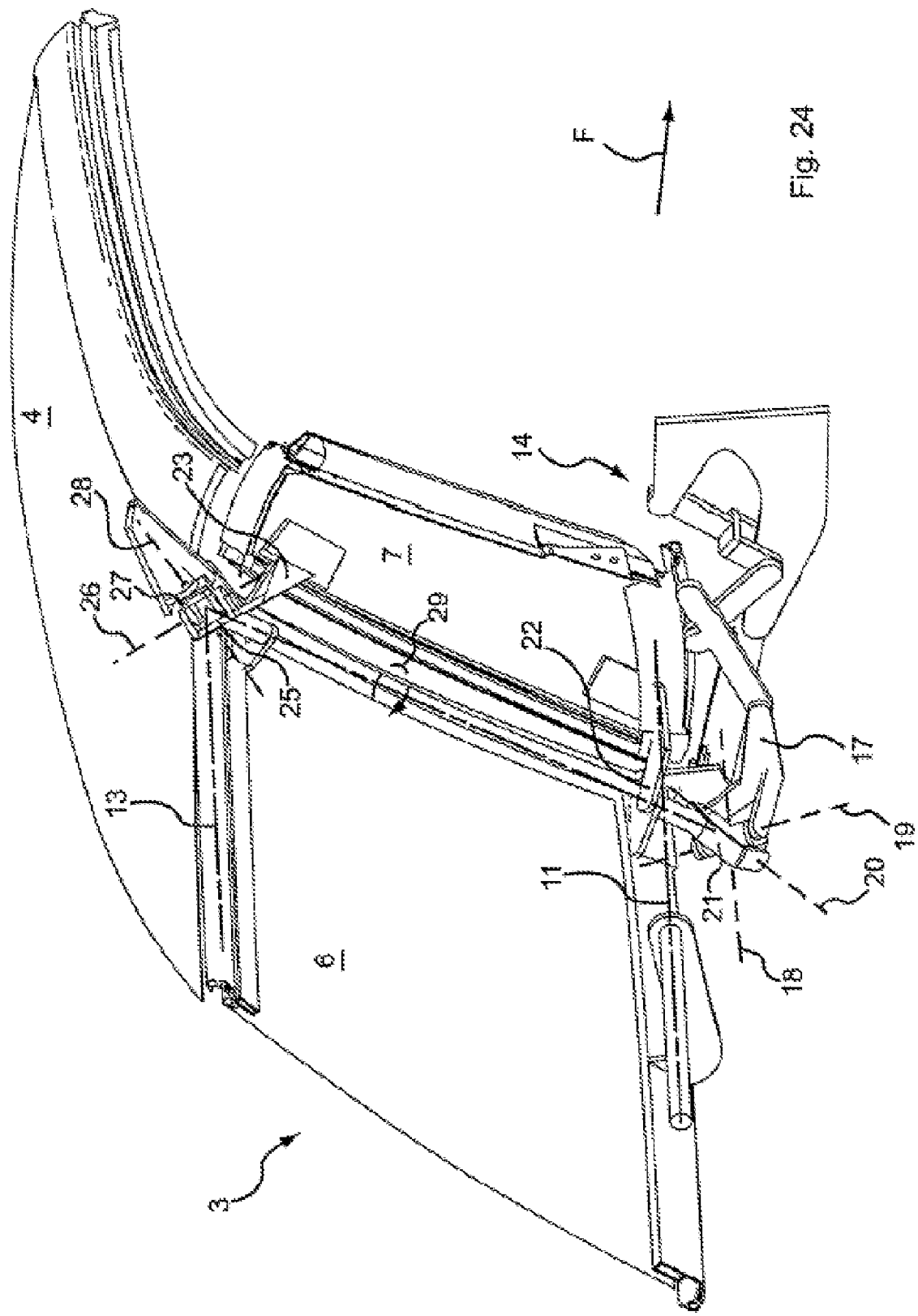

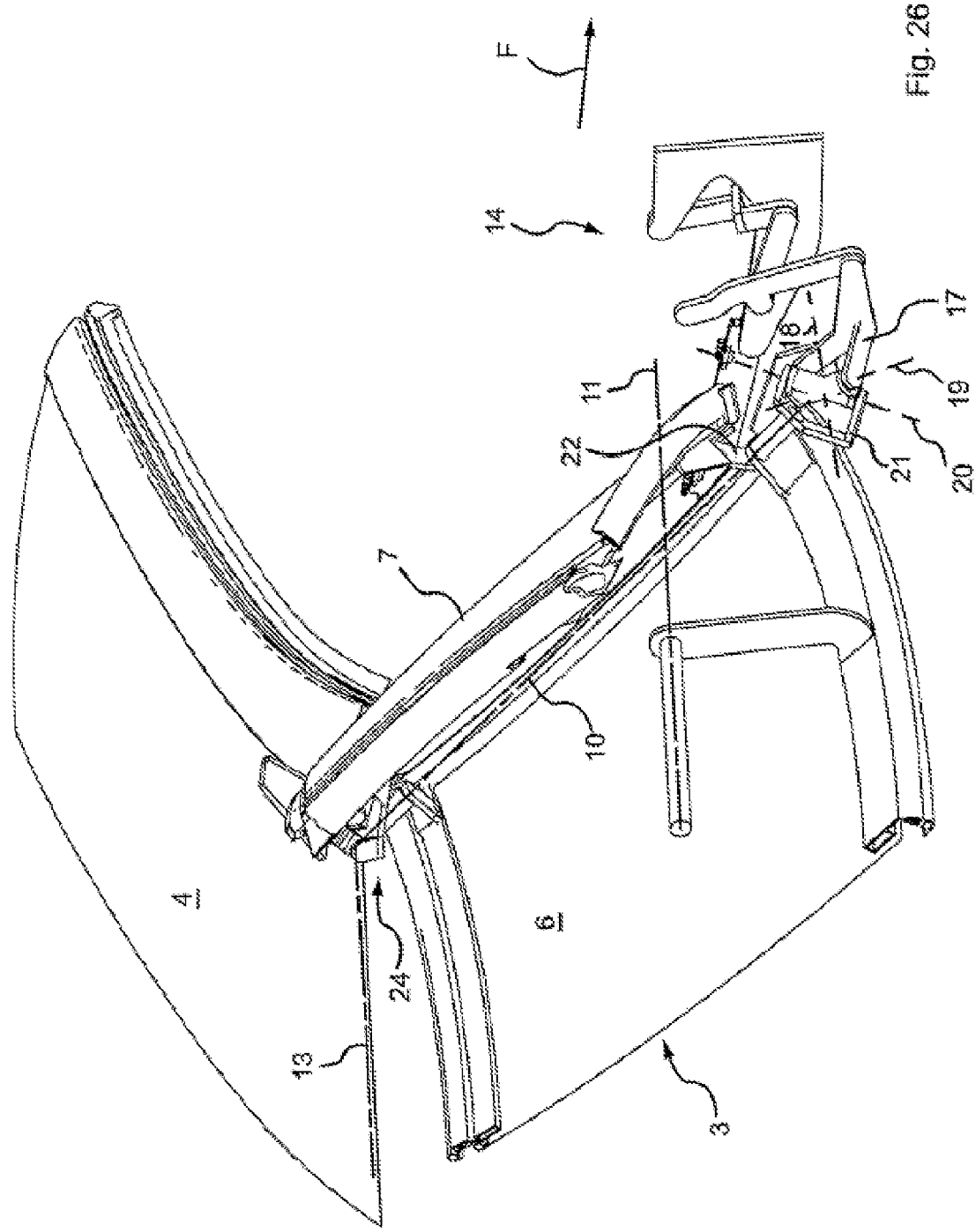

C Pillar Hidden

CONVERTIBLE VEHICLE

CROSS-REFERENCE TO RELATED APPLICATION(S)

This application is a US National Phase of International Application No. PCT/DE 2005/000805, filed Apr. 30, 2005, which claims priority to German 10 2004 021 577.4 filed May 3, 2004. The entire contents of the above identified applications are incorporated herein by reference.

TECHNICAL FIELD

The invention concerns a convertible vehicle with at least two roof elements, as well as a corresponding roof.

BACKGROUND OF THE INVENTION

There are known convertible vehicles, which have two consecutive roof elements in the closed condition, one of which, the rear element, can swivel downwards about a transverse axis in relation to the car body, so that in the stowed-away condition it lies essentially horizontal and with its side facing the passenger compartment pointing upward when the roof is closed. The front roof element when opening the roof can swivel onto the rear roof element about a second transverse axis situated in the boundary region between the roof elements and in the opened state it is oriented in opposite sense to the former. In order to relay the opening and closing motion also to the front roof element, there are provided two rod elements on each side of the vehicle, extending from a main bearing in the car body and as far as the connection region of the rear and front roof elements, which open and close in the manner of a parallelogram when the roof is moved. The rod elements are often also known as guide rods and main guide rods. Due to their mutual opening and closing, these elements disturb the visual field during the opening process and there is a danger of getting caught between the rods as they close. Furthermore, a considerable expense must be incurred for paneling in the rear roof element to prevent at least the front rod of the two from being visible when the roof is closed.

SUMMARY OF THE INVENTION

The basic problem of the invention is to achieve an improvement here.

According to the invention, the front rod element looking in the direction of travel, also known as the main guide rod, is dispensable. This not only improves the appearance, but also avoids a danger of jamming between the closing rods. The swivel-in movement of the front roof element can be constrained and relayed by the shaft(s) and needs no additional drive or control means, so that the design is kept simple.

Advantageously, the shafts which accomplish the swiveling of the front roof element with respect to the rear element lie parallel to the plane of the rear roof element, so that they can be fitted flat against it and protrude only slightly in the direction of the passenger compartment.

A reliable and nonjamming guidance of the force flow is made possible by providing an upper three-dimensional link mechanism to translate the rotary motion of the shaft into the swivel motion between the roof elements. Likewise, a three-dimensional link mechanism can also be provided in the lower region between the displacement of the rear roof element and the rotary motion of the shaft. A structurally simple upper and/or lower three-dimensional link mechanism is made possible by configuring it as a spherical link mechanism.

The upper and/or lower three-dimensional link mechanism is especially simple and reliable when designed as a universal joint.

In particular, a reliable kinematics, operating solely through swivel connections with no risk of skewing, will result if the rear roof element for its displacement can swivel about a first axis lying transverse to the vehicle, the front of element can swivel relative to the rear roof element about a second axis lying parallel to the latter, and the mediating shafts link both swivel axes.

Then a single drive is provided for the movement of the rear roof element about a first axis lying transverse to the vehicle, the front roof element about a second axis, and for the rotary movement of the shaft, which serves directly to produce the movement of the rear roof element about a first axis lying transverse to the vehicle and constrains the other motions by means of the shafts.

In particular, the shafts can be bent at right angles, so that they do not extend in a straight line for the entire height of the rear roof element, but instead the torque transmission in the central region occurs through the C pillars themselves and these have only stub axes above and below, which enclose their pivot axis and do not interfere with the passenger space.

The bent-angle drive shafts also enable a broad rear windshield, whose clear width is not narrowed by these shafts.

Thus, when the shafts do double duty and serve also as pivot axis for C pillars of the rear roof element, lying at the side of a rear windshield, they can be turned inward during the opening of the roof and lie above the rear windshield when the roof is opened, so that the dimension of the stowed-away roof package is not increased downward. Since the front roof element any way is curved and oriented in opposite sense to the rear roof element in the stowed-away condition, enough room is available for the swiveled-in C pillars, without having to increase the thickness of the stowed-away roof package. In particular, the C pillars can swivel into the empty space between oppositely curved roof elements. The roof package is much more narrow than that of fixed C pillars, so that the roof stowage space is narrowed and the edge joint of a hood cover can be moved substantially toward the middle of the vehicle, which improves the design qualities of the vehicle. The swivel-in movement of the C pillars, furthermore, is possible by pivot axes with slight mechanical effort. At the same time, the package of stowed-away roof elements is also more flat, so that the tail end of the vehicle can also have a more flat and visually pleasing design.

Additional advantages and features of the invention will result from sample embodiments of the object of the invention, shown schematically in the drawing and described hereafter.

BRIEF DESCRIPTION OF THE DRAWINGS

The drawings shows:

FIG. 1 is the vehicle with the roof closed, FIG. 2 is a view similar to FIG. 1 with pivot axis of the C pillars also drawn in, FIG. 3 is a view similar to FIG. 1 with roof still closed and rear cover already opened to free up an entry opening for the roof, FIG. 4 is a view similar to FIG. 3 with pivot axis of the C pillars also drawn in, FIG. 5 is a view similar to FIG. 3 with opening of the roof commencing, FIG. 6 is a view similar to FIG. 5 with pivot axis of the C pillars also drawn in, FIG. 7 is a view similar to FIG. 5 with opening of the roof continuing further, FIG. 8 is a view similar to FIG. 7 with pivot axis of the C pillars also drawn in, FIG. 9 is a view similar to FIG. 7, with roof opened and rear cover still opened, FIG. 10 is a view similar to FIG. 9 with pivot axis of the C pillars also drawn in, FIG. 11 is a view similar to FIG. 9 with roof fully opened, FIG. 12 is a view similar to FIG. 11 with pivot axis of the C pillars also drawn in, FIG. 20 is a view of the opened roof, FIG. 21 is a view similar to FIG. 20, also showing the pivot axis of the C pillar and swivel axes of the rear roof element relative to the car body and of the roof elements relative to each other, FIG. 22 to FIG. 29, the phases of the roof opening in perspective view from the direction of the passenger cabin, looking at the left rear half in the direction of travel, drawn separately, where FIG. 22 is the closed roof, also showing the pivot axis of the C pillar and swivel axes of the rear roof element relative to the car body and of the roof elements relative to each other, FIG. 24 is the roof, also showing the pivot axis of the C pillar and swivel axes of the rear roof element relative to the car body and of the roof elements relative to each other, during its initial opening, somewhat corresponding to the position per FIGS. 7 and 16, FIG. 25A and FIG. 25B are detail views of the upper and lower three-dimensional link mechanism in this position, FIG. 26 is the roof, also showing the pivot axis of the C pillar and swivel axes of the rear roof element relative to the car body and of the roof elements relative to each other, during its initial opening, somewhat corresponding to the position per FIGS. 9 and 18, FIG. 27A and FIG. 27B are detail views of the upper and lower three-dimensional link mechanism in this position.

DESCRIPTION OF THE PREFERRED EMBODIMENTS

Figure 1:
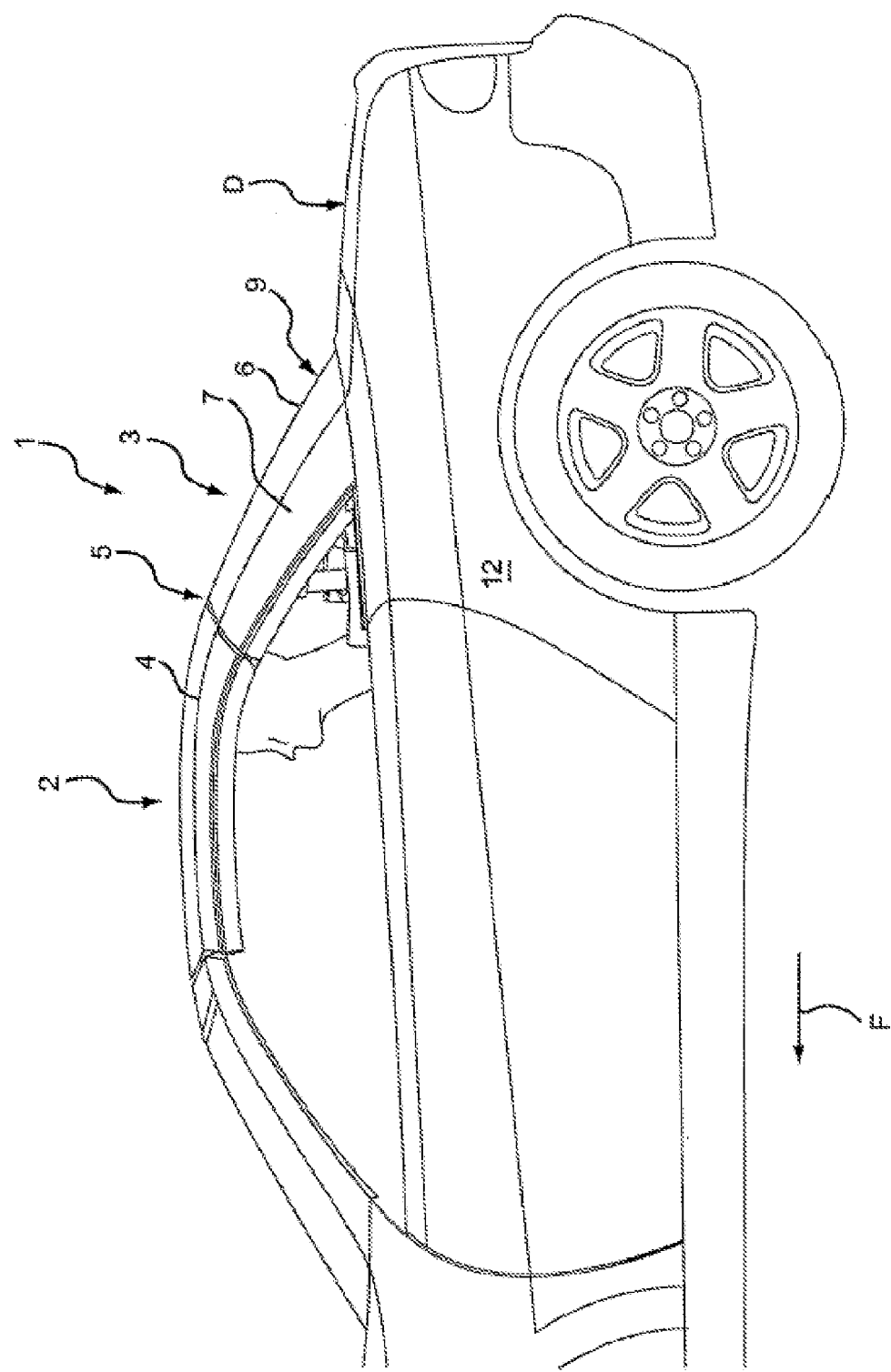
FIG. 1 to FIG. 12, the phases of the roof opening of a convertible vehicle according to the invention in a side view broken off in the front region, where
Figure 2:
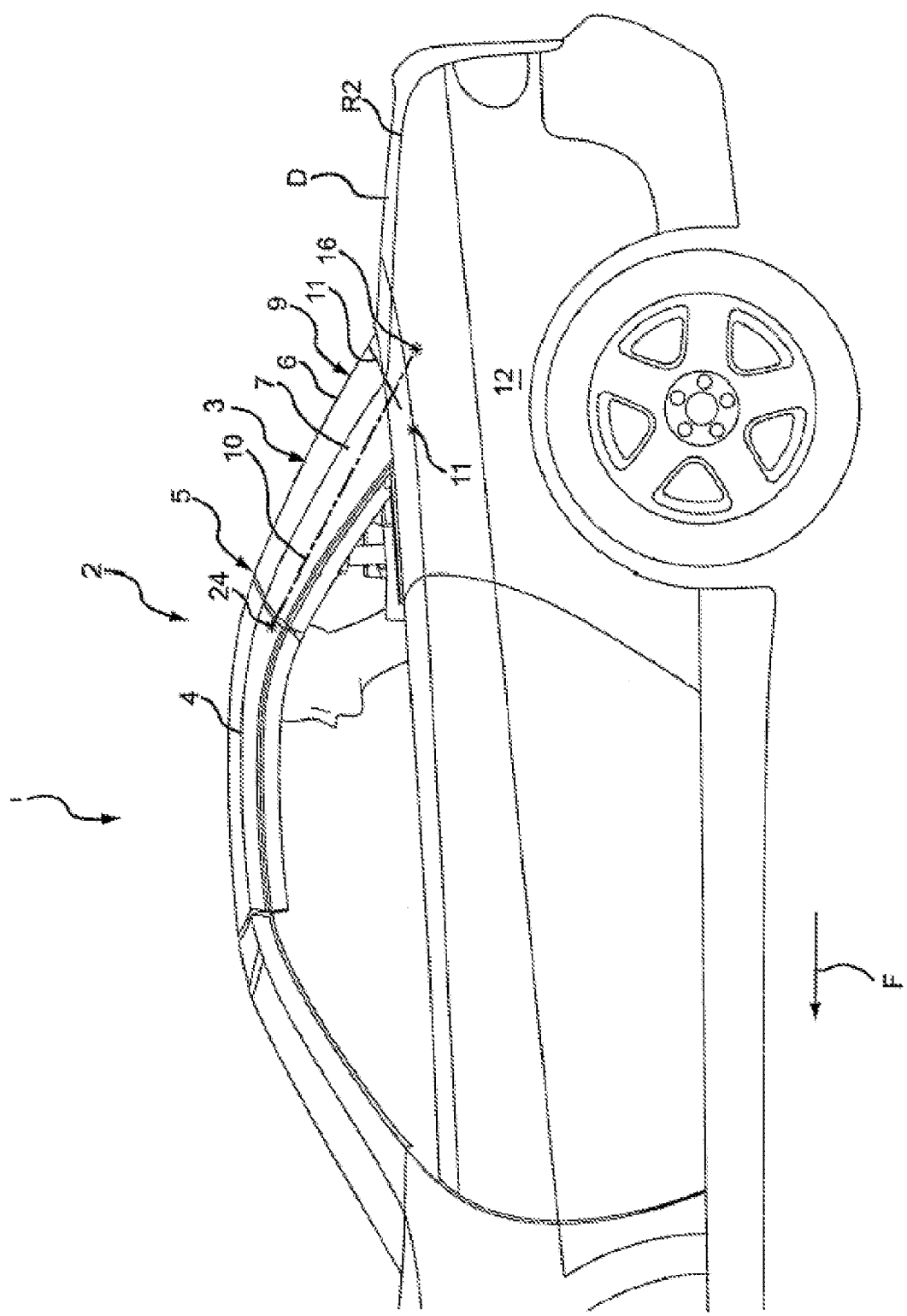
Figure 3:
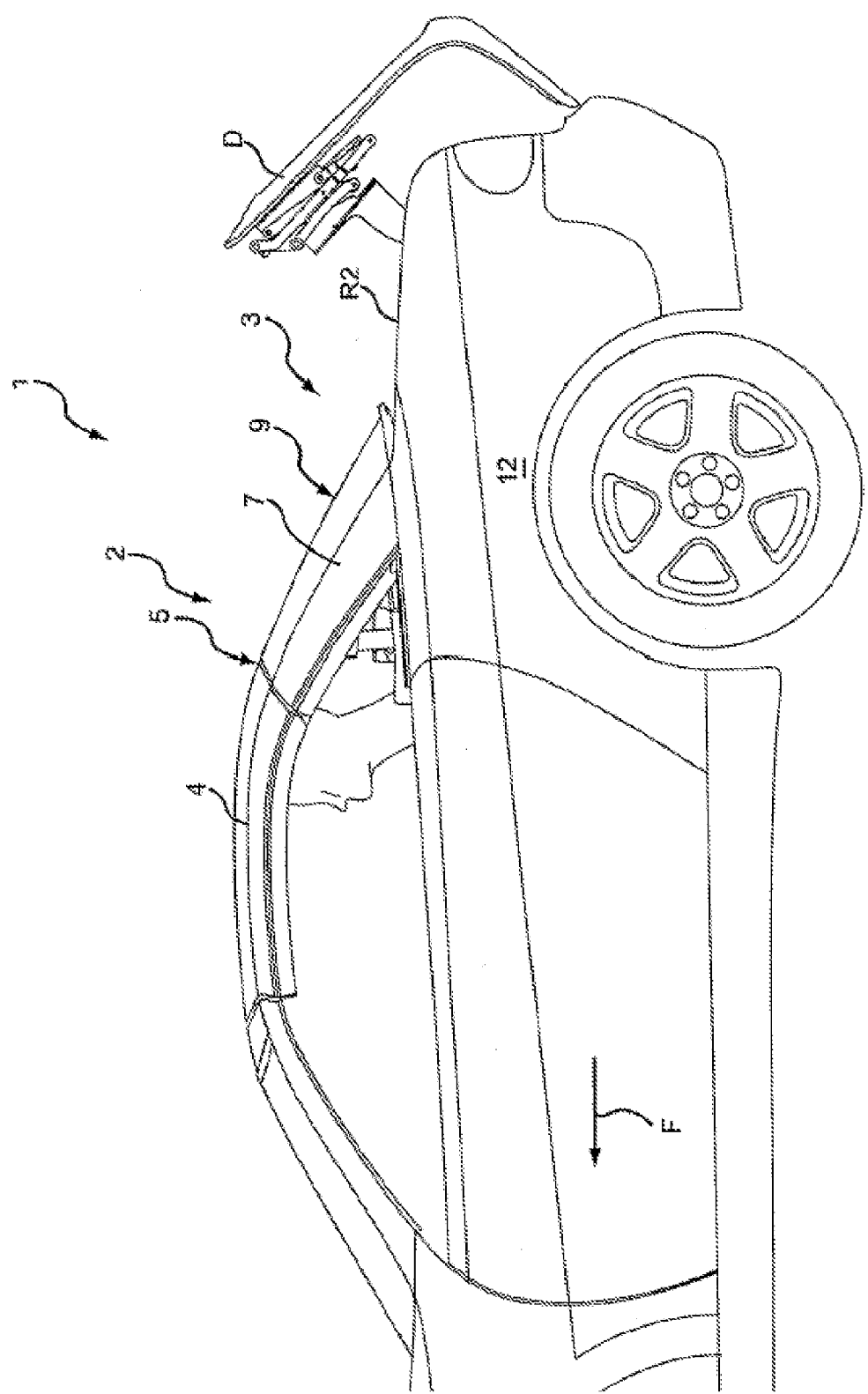
Figure 4:
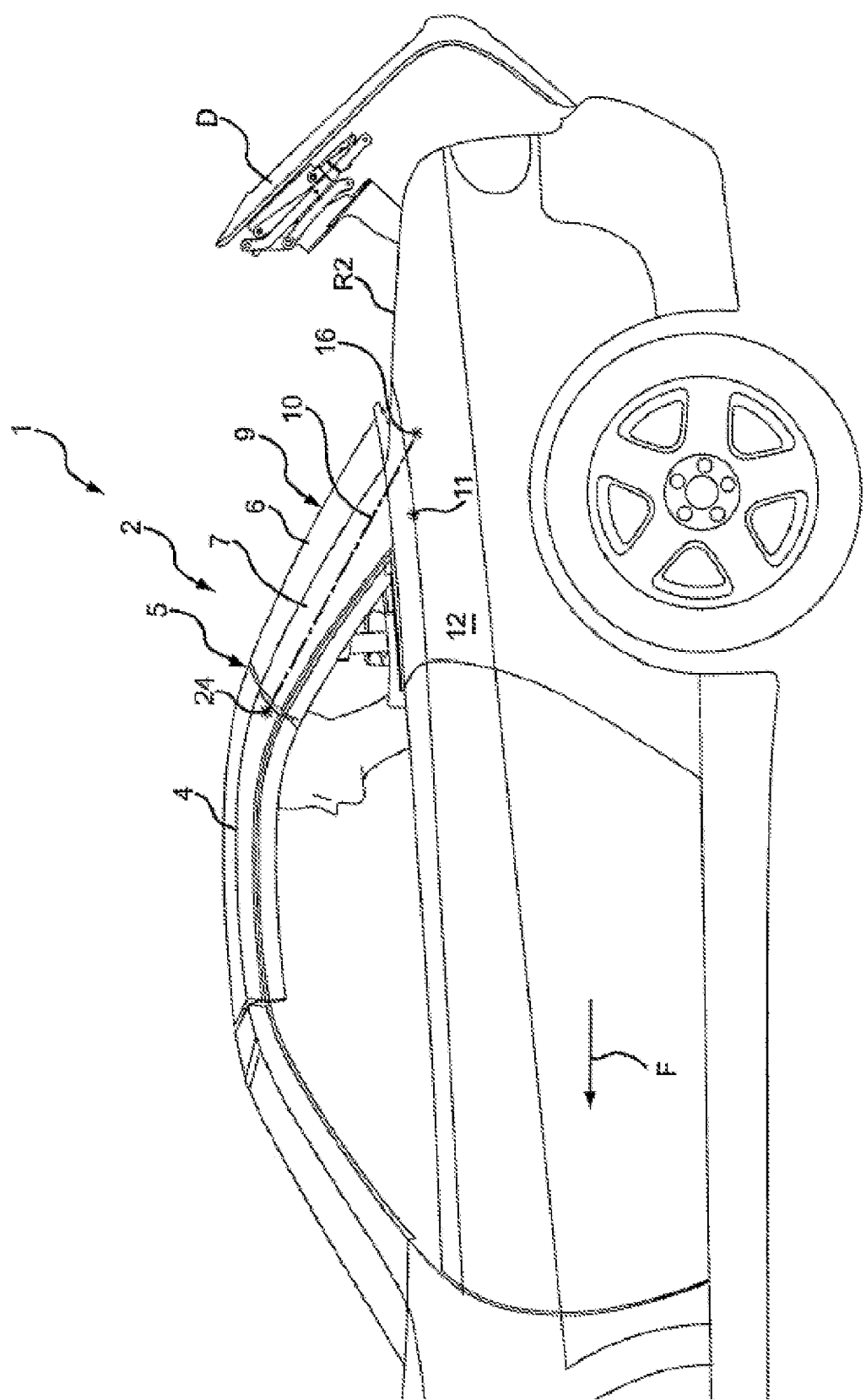
Figure 5:
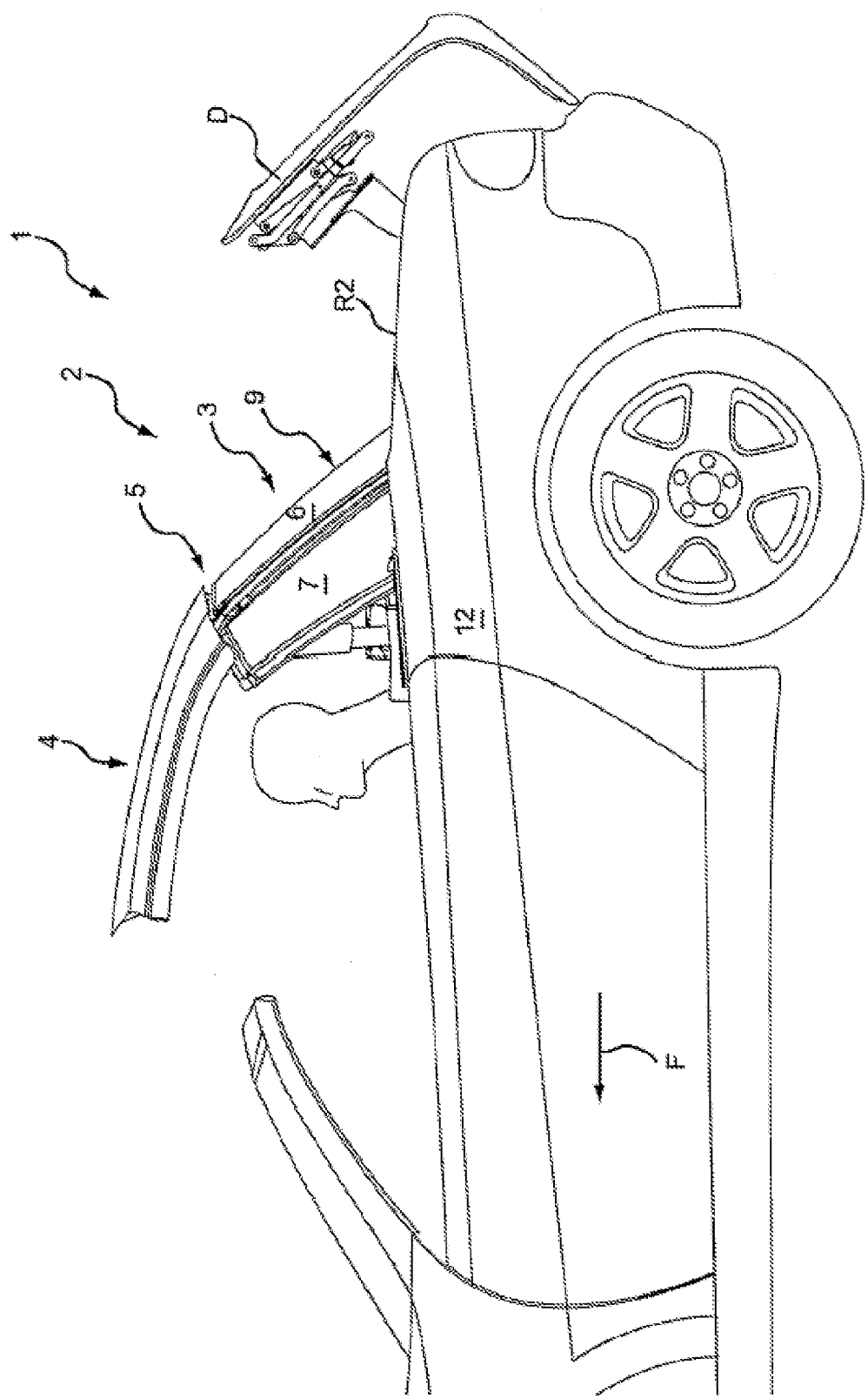
Figure 6:
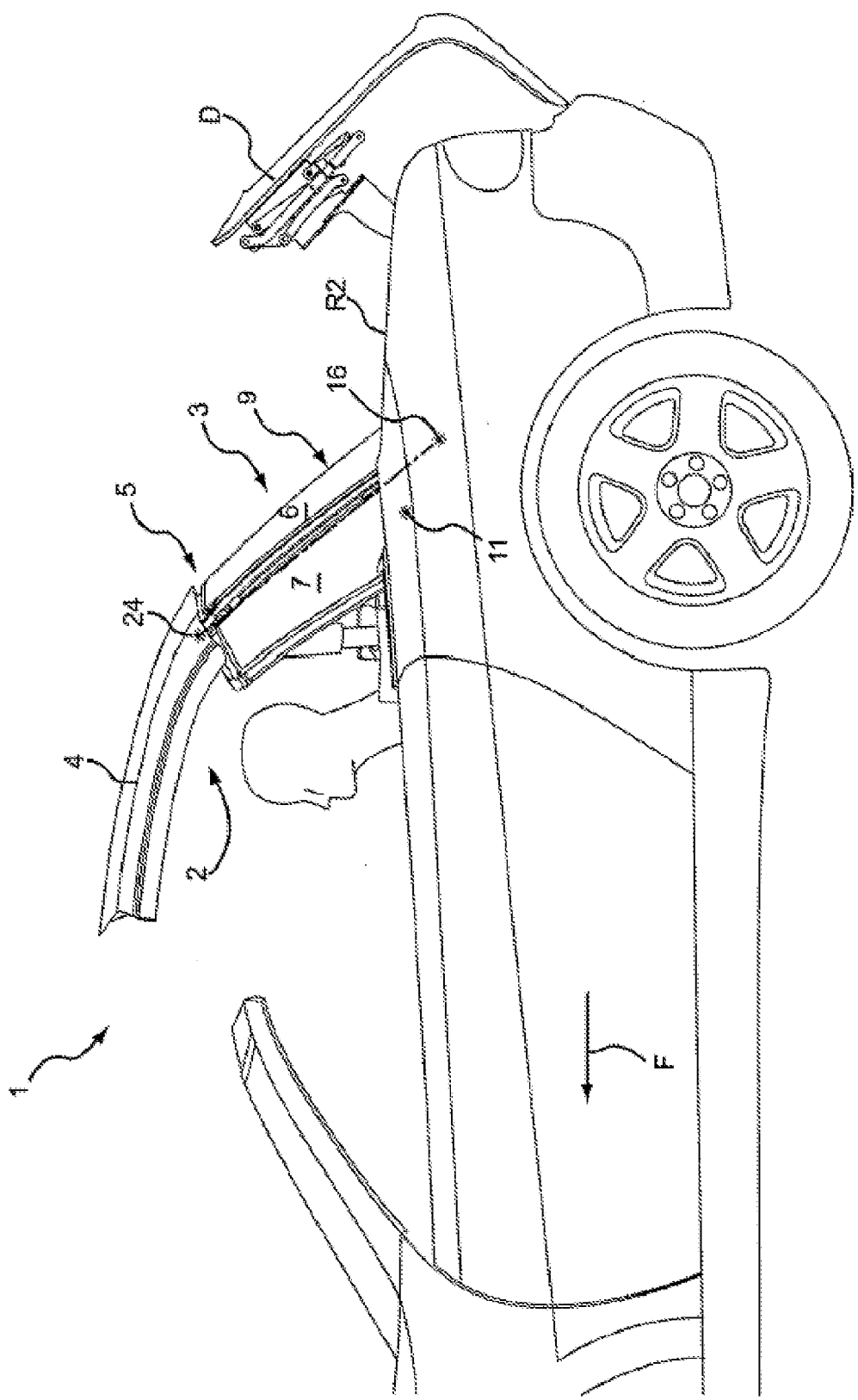
Figure 7:
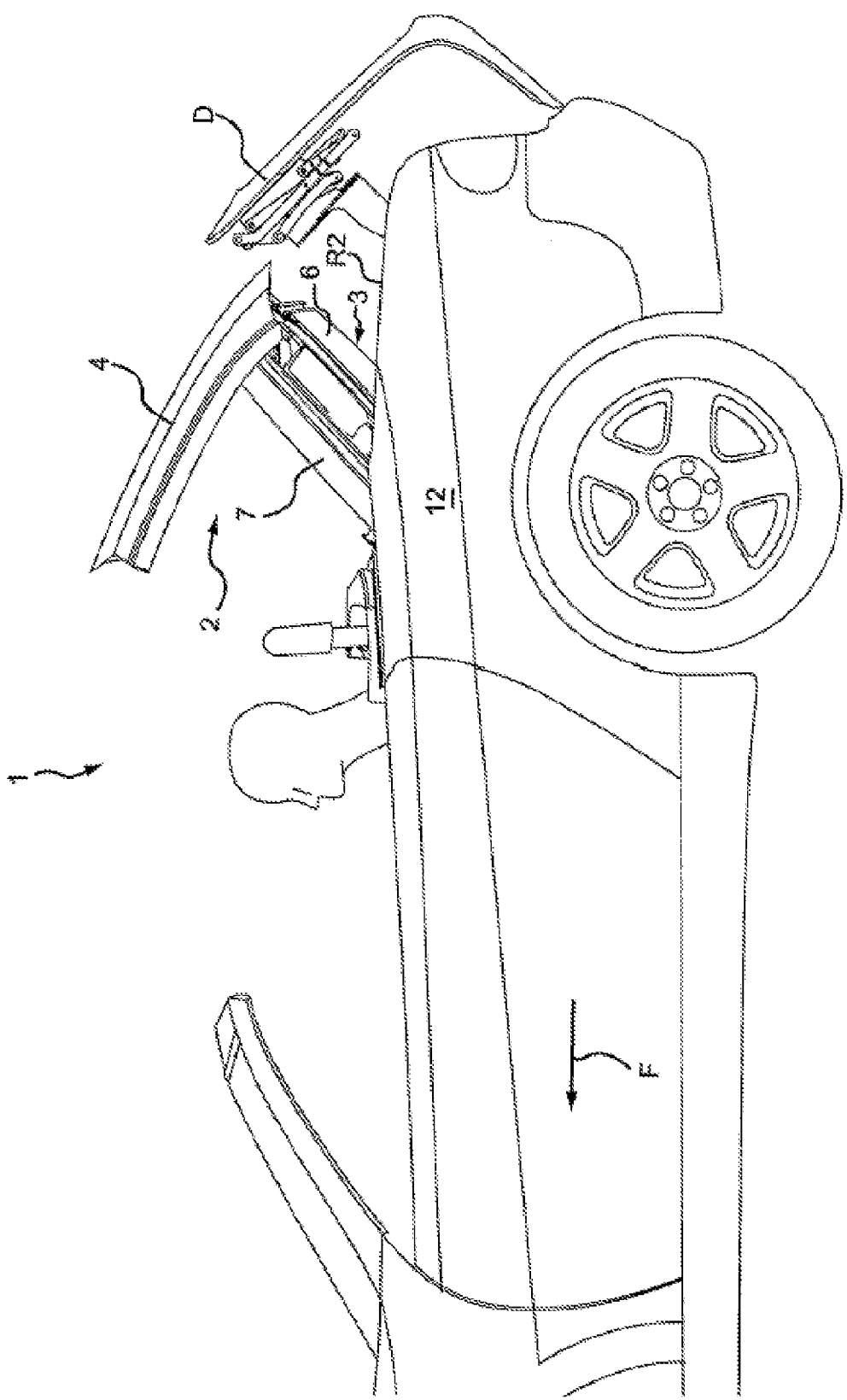
Figure 8:
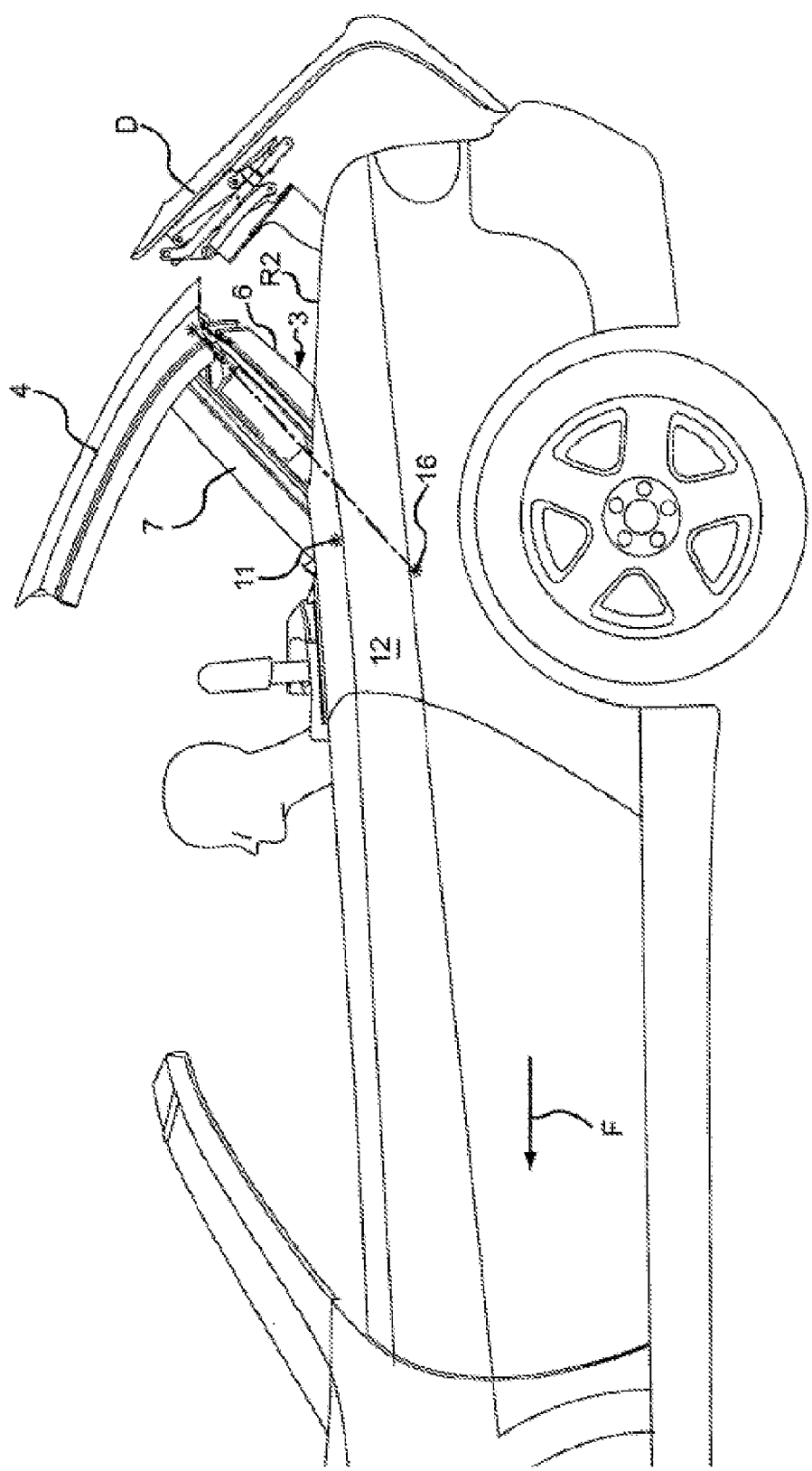
Figure 9:
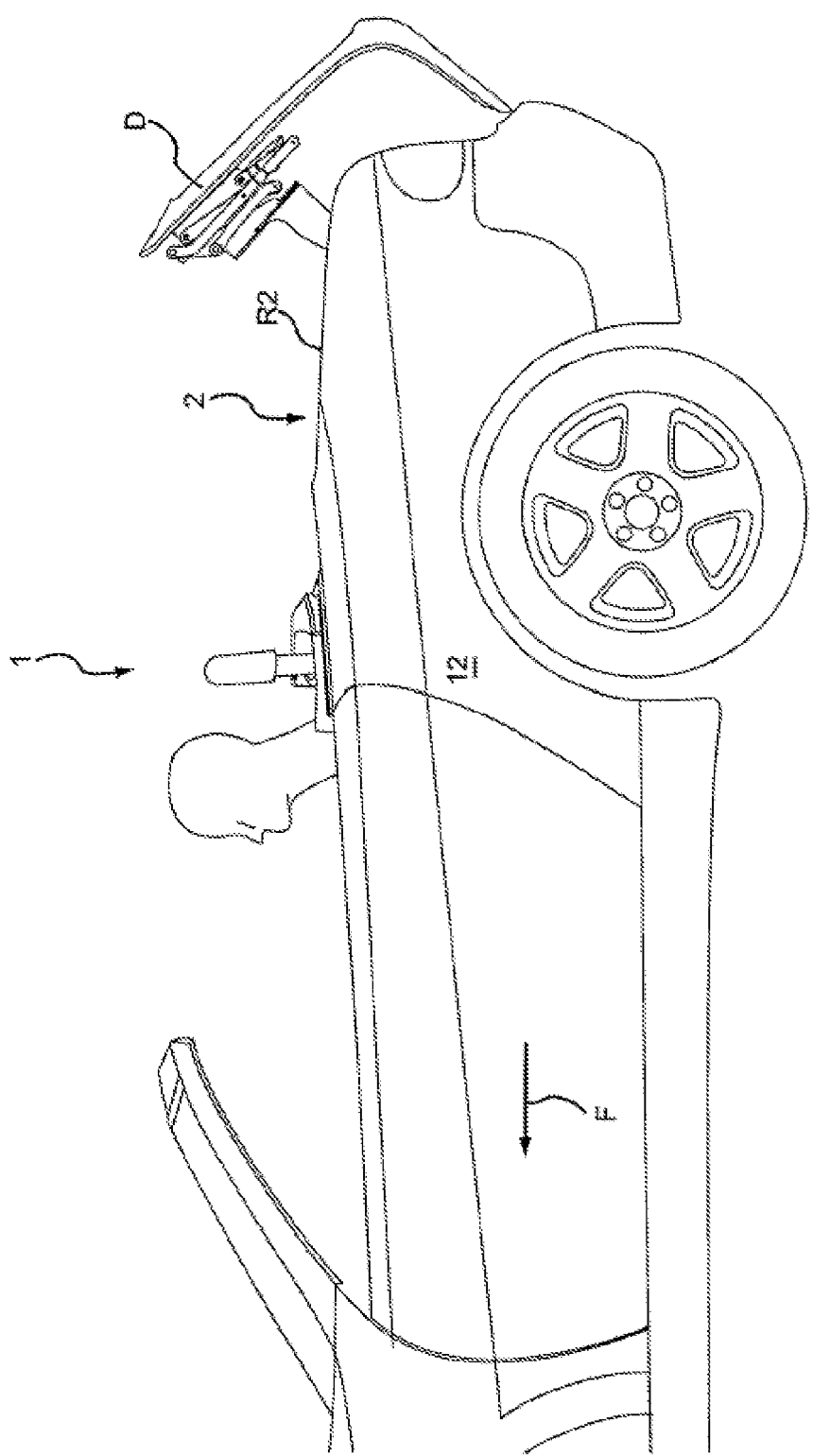
Figure 10:
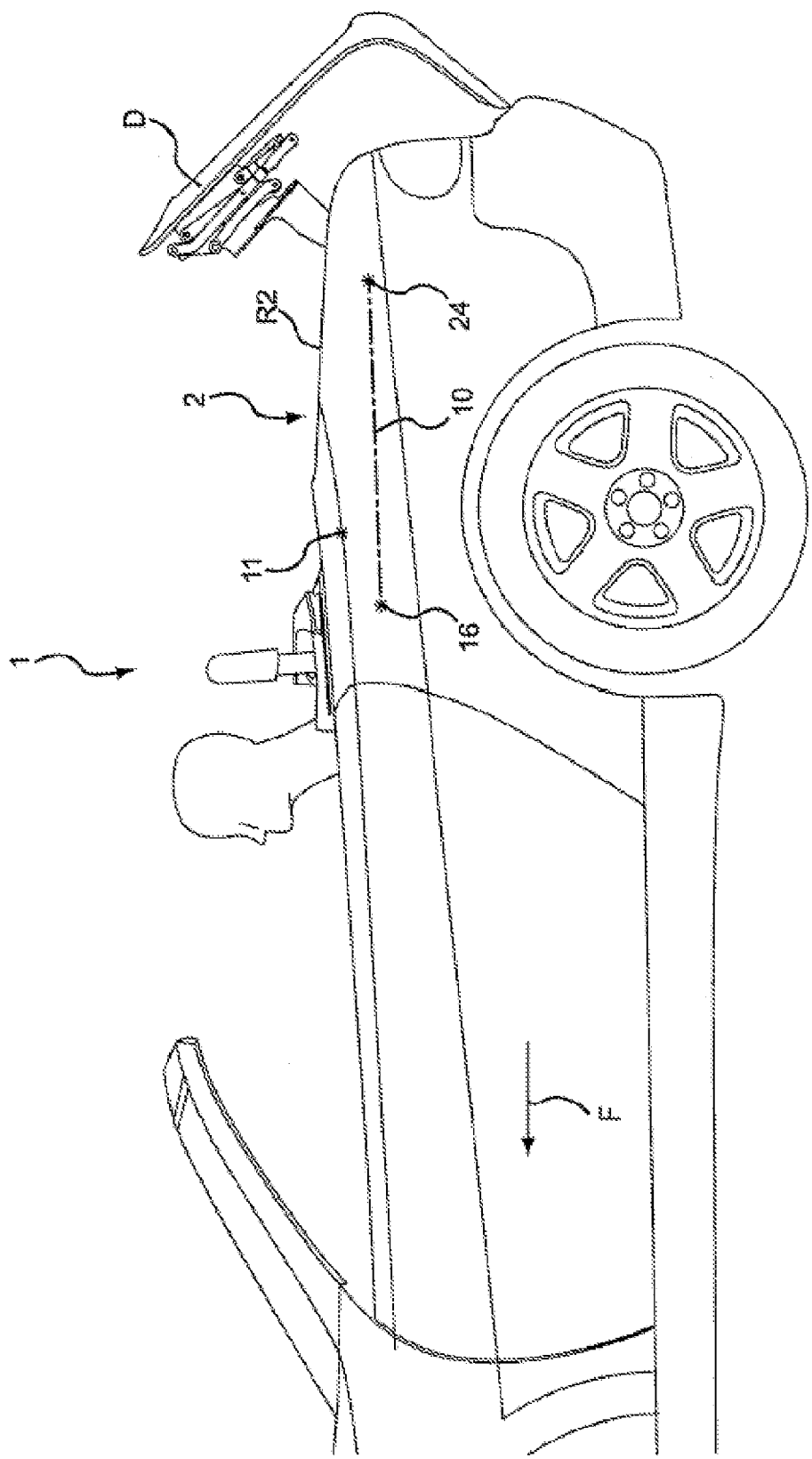
Figure 11:
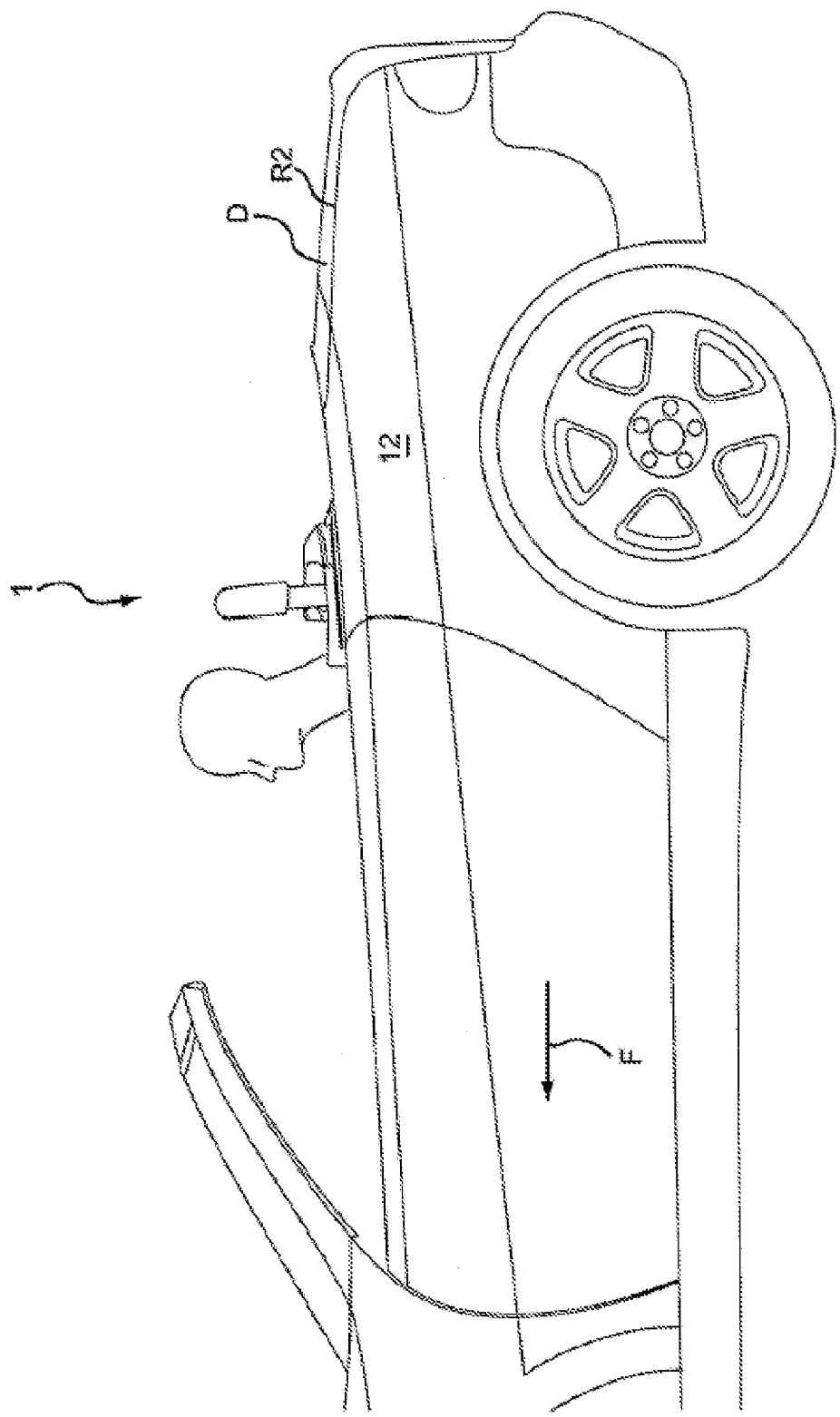
Figure 12:
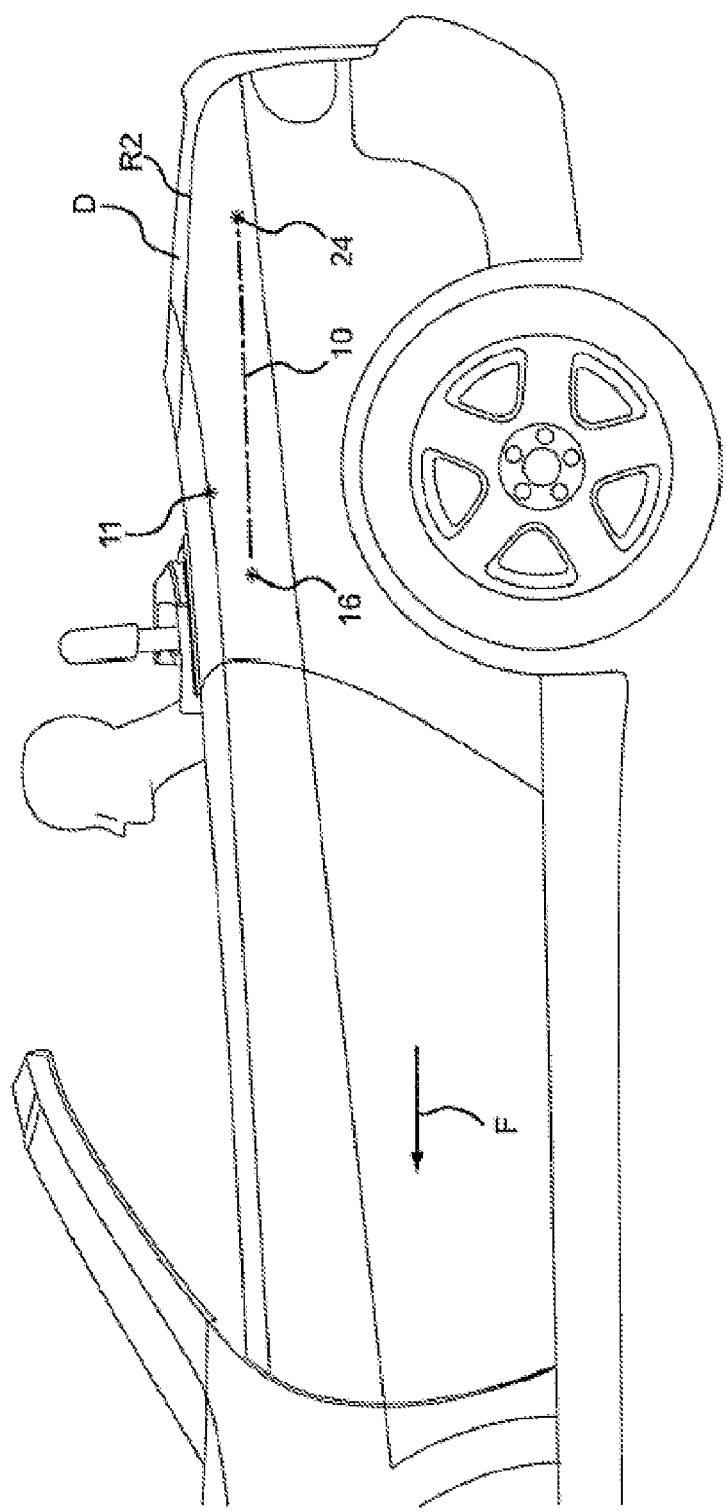

The convertible vehicle 1 of the invention comprises, in the sample embodiments shown, two roof elements 3, 4 one behind the other in the direction of travel F when the roof 2 is closed and separated from each other by at least one joint 5 lying basically transverse to the vehicle. The rear roof element 3 has a rear windshield 6 in a central segment 9 relative to the transverse direction of the vehicle and extends upwards at a slant. The rear windshield 6 can be the folding kind or, in particular, rigid and consist of plastic or glass, for example. The roof element 4 is arranged in front of the rear roof element 3 in the closed condition (FIG. 1) and lies essentially horizontal. One or more additional movable roof elements can be movably joined, say, to the front roof element 4, for example, they can be linked to it. Therefore, the convertible vehicle 1 of the invention can either be a two-seater or comprise a larger passenger compartment with two or more seat rows one behind the other.

The roof elements 3, 4 are essentially formed from rigid pieces and comprise at least rigid frames, over which a cover can be stretched.

The rear roof element 3 is divided along its height in the sample embodiments and besides the central segment 9 it comprises C pillars 7 situated at least essentially alongside the former and able to move relative to the central segment 9. These can also comprise transverse brackets or the like, which extend above or below the rear windshield 6 in the direction of a vertical longitudinal midplane 8. When opening the roof, the C pillars 7 can swivel in relative to the central segment 9 with the rear windshield 6 of the roof element 3 about pivot axes 10, which at the same time form at least partly the drive shafts A for the swiveling of the front roof element 4 relative to the rear roof element 3 and which when the roof 2 is closed have one component in the direction of travel F, one transverse to the direction of travel F, and one upwardly directed component. In the sample embodiments shown here, the pivot axes 10 lie parallel to the plane of the rear roof element 3 and parallel to the side edges 6a of the rear windshield 6, which is not mandatory.

To open the roof, the rear roof element 3 can move rearwards and downwards and the front roof element 4 can swivel onto the rear roof element 3.

The movement of the rear roof element 3 occurs about a first swivel axis 11 which is horizontal and lies transversely to the vehicle 1, and which can be fixed relative to the car body 12 or it can move during the opening process. The stow-away movement can also be a superimposed motion with translatory and rotary components on a circular orbit or some other curve. In the sample embodiment, the axis 11 is fixed relative to the car body 12.

The swiveling of the front roof element 4 onto the rear roof element 3 occurs about a second, upper, horizontal swivel axis 13, which can move along with it, and it can be mediated by the drive shafts A.

The roof 2 is held movably on the car body 12 by side-mounted main bearings 14. The opening or closing movement of the rear roof element 3 can be accomplished by side-mounted drives 15 moving about two of these (in the present case). A single side-mounted or middle drive 15 can also be sufficient. In the sample embodiment, similar structural conditions exist at both sides of the vehicle, and two side-mounted drives 15 are provided.

When the roof is opened or closed, two lower three-dimensional linkage mechanisms 16 intersecting the drive shafts A (FIG. 24) and lying to the side swivel about the horizontal first swivel axis 11. In the sample embodiments, these are configured as universal joints, which is not mandatory, but it is especially simple in mechanical respects and is reliable in operation. The drive shafts A coincide in their trend in the uppermost and lowermost region of their dimension with pivot axes 10, about which the C pillars can turn, here shown swiveling separately.

The lower universal joints 16 are each held by a movable forked lever 17, which is slanted relative to the universal joints 16. This can swivel about a horizontal axis 18 running transversely to the vehicle 1 and able to move on a circular orbit about the first swivel axis 11 during the opening of the roof. Within the fork opening of the lever 17 is held a first arm of an x-shaped cross body, at whose center the axis 19 of this arm intersects the axis 20 of the second arm at an acute angle. The axis 18 also intersects this point. The second arm of the cross body with its pivot axis 20 is enclosed by a second forked seat 21, which is slanted to the pivot axis 10 and drive shaft A and joined to the latter. Since the drive shaft A also intersects the point of intersection of the axes 18, 19, 20, the three-dimensional link mechanism 16 is therefore configured as a spherical link mechanism.

A swiveling of the rear roof element 3 about the axis 11 thus necessarily produces a turning of the drive shafts A, without this requiring a special drive unit. The drive shafts A can be bent at right angle by sideways extending brackets 22, 23, as in the first sample embodiment, so that they are formed by the C pillars 7 themselves in the central region. This is made possible in that the drive shafts A are configured in the lower region as stub axes and only extend from the universal joints 16 to the brackets 22. These transmit the rotary motion on to the C pillars 7, situated further outward, and thus also becoming part of the drive shafts A, and by means of upper brackets 23 again inwards to upper universal joints 24, which as the upper three-dimensional link mechanism translate the rotary motion of the drive shafts A into the swiveling motion of the roof elements 3, 4 about the upper swivel axis 13.

Because the drive shafts A in the upper and lower region emerge into the C pillars, lying further on the outside, by means of the brackets 22, 23, through which the pivot axes of the C pillars 7 run, these can run more on the outside with their edges facing the center of the vehicle 8 for a middle portion of their dimension relative to the vertical. Thus, the outer edges 6a of the rear windshield 6 can lie at the side outside the pivot axes 10, without being covered by the latter. This optimizes the view to the rear.

Therefore, on the whole, the rear roof element 3 can swivel, when changing position, about a first axis 11 lying transverse to the vehicle, the front roof element 4 can swivel relative to the rear roof element 3 about a second axis 13 lying parallel to the latter, and the drive shafts A comprising the pivot axes 10 of the C pillars 7 in the upper and lower region link the movements about both swivel axes 11, 13.

The universal joints 24 in the upper region of the drive shafts A and pivot axes 10 likewise translate with no additional drive units the rotary motion of the drive shafts A into the swivel movement of the front roof element 4 with respect to the rear roof element 3 about the second swivel axis 13, lying horizontal and transverse to the vehicle.

For this, the universal joints 24 each enclose a forked seat 25, slanting to the axis 10 and shaft A, into which the drive shafts A emerge. This is connected via a first auxiliary axis 26 to a second forked seat 27, which is linked to the front roof element 4 and can swivel about a second auxiliary axis 28. Thanks to the torque about the axes 10 introduced via the brackets 23 of the C pillars 7, the forked seat 25 is swiveled in the direction of the arrow 29 when the roof opens and thus pulls the oppositely situated forked seat 27 downward in the direction of the rear roof element 3, so that the front roof element 4 is forced to swivel about the axis 13, which intersects both auxiliary axes 26, 28 and the pivot axes 10. The upper link mechanism 24 is therefore also a spherical link mechanism, in which all axes 10, 26, 28, 13 intersect at one point.

Thus, a single drive 15 is sufficient overall for the movement of the rear roof element 3 about the first swivel axis 11 lying transverse to the vehicle 1, the front roof element 4 about the second horizontal swivel axis 13, and for the rotary motion of the C pillars 7 about the axes 10, and this can directly drive the movement of the rear roof element 3 about the first axis 11.

As described, in the first sample embodiment the pivot axes 10 of the C pillars 7 are enclosed for at least part of their region by the drive shafts A in the upper and lower region, so that the swiveling of the front roof element 4 can be mediated by the rotary movement of the C pillars 7, for which it can be translated into a swivel movement between the roof elements 3, 4 in the region of the joint 5 between them.

Figure 30:
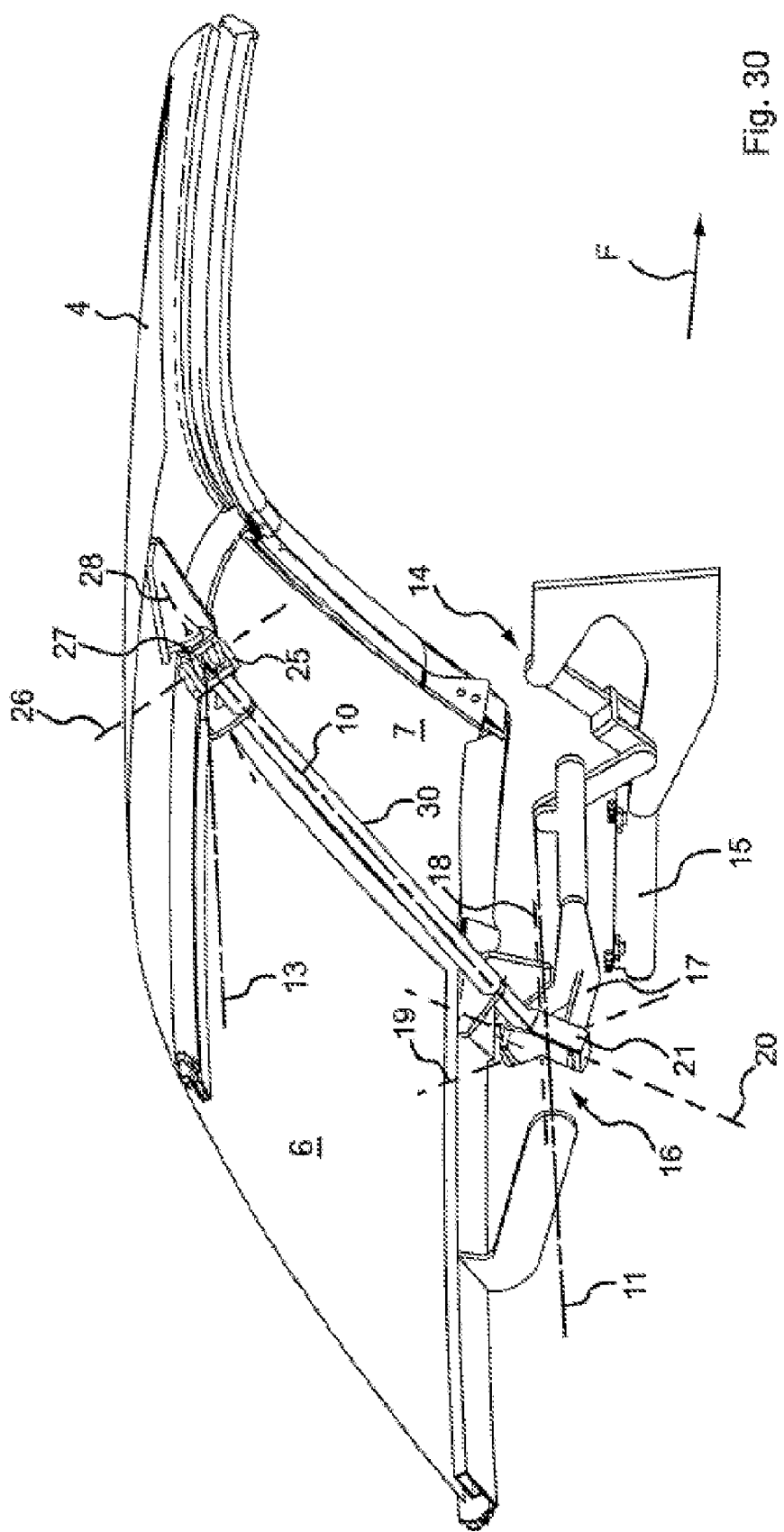
FIG. 30 is a view similar to FIG. 22, but with a continuous torsion bar connecting the upper and lower three-dimensional link mechanisms.

As an alternative, as is shown in the second sample embodiment per FIG. 30, a continuous torsion bar 30 can also be arranged as a drive shaft A on each side of the vehicle, from which the C pillars are suspended. The C pillars themselves then play no force-relaying function to apply a torque to the upper roof element and are thus not part of the drive shafts A, but rather the force relaying is accomplished solely by means of the continuous torsion bars 30.

Alternatively, it would also be possible to use the torsion bars 30 as drive shafts A, without suspending the C pillars 7 from them, or even to configure them as being separately movable. Then, when the roof was stowed away, the full width of the rear roof element 7 would be preserved.

In both sample embodiments, during the opening of the roof the C pillars 7 are swiveled about the axes 10 with respect to the middle segment 9 so that in the position when the roof has been opened they lie between the roof elements 3, 4 and are curved in the same direction relative to the front roof element 4. Since in any case the roof elements 3, 4 in the stowed-away condition lie curved oppositely toward each other, the empty space lying between them can be utilized very economically for the swiveling-in C pillars 7, without further loss of room.

Figure 13:
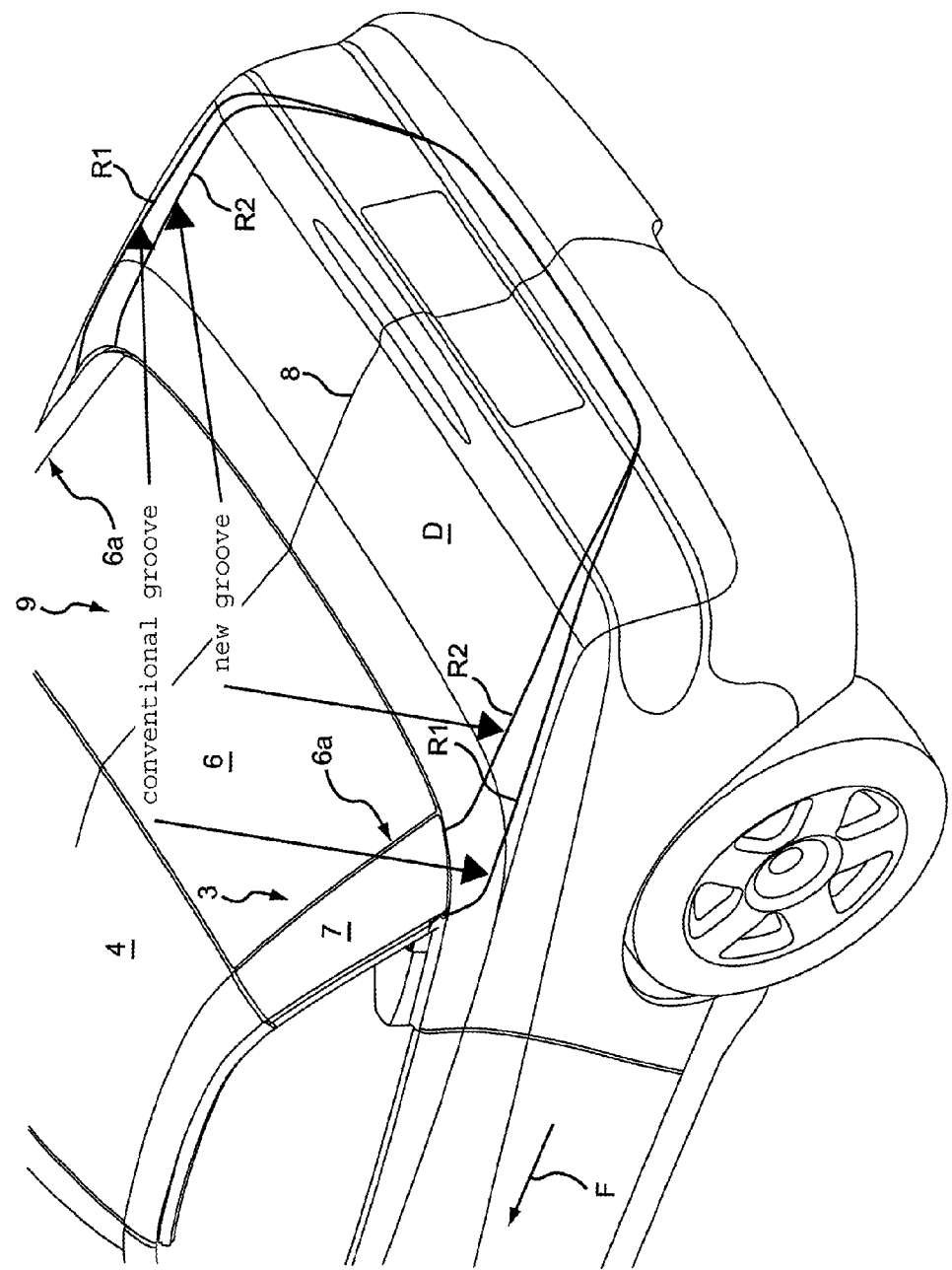
FIG. 13 is a perspective view of the vehicle's rear with conventional edge joint, and also showing the edge joint of the rear cover of the invented vehicle, FIG. 14 to FIG. 21, the phases of the roof opening in perspective view of the left half of the roof, drawn by itself, looking in the direction of travel, where
Figure 14:
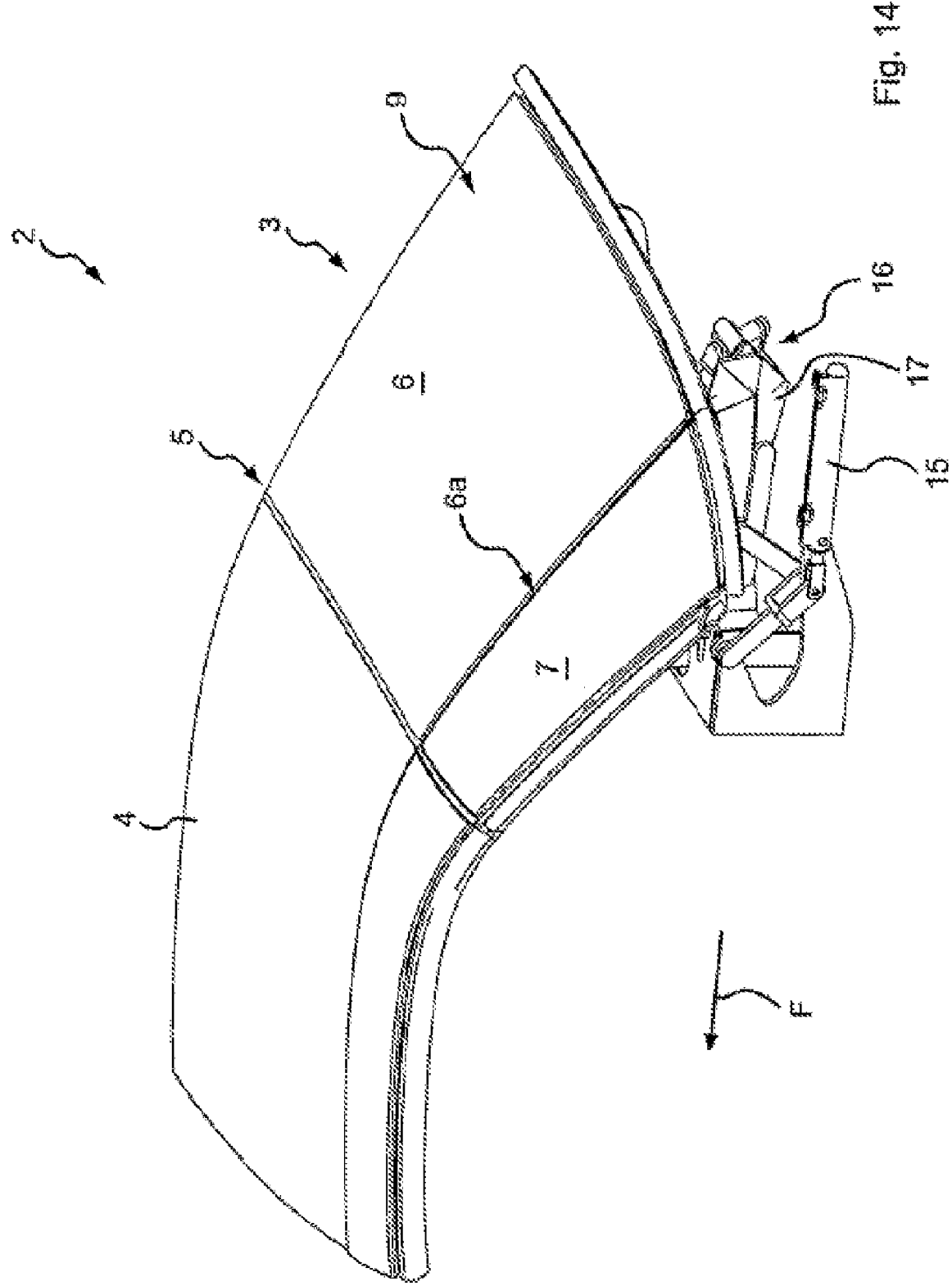
FIG. 14 is a view of the closed roof.
Figure 15:
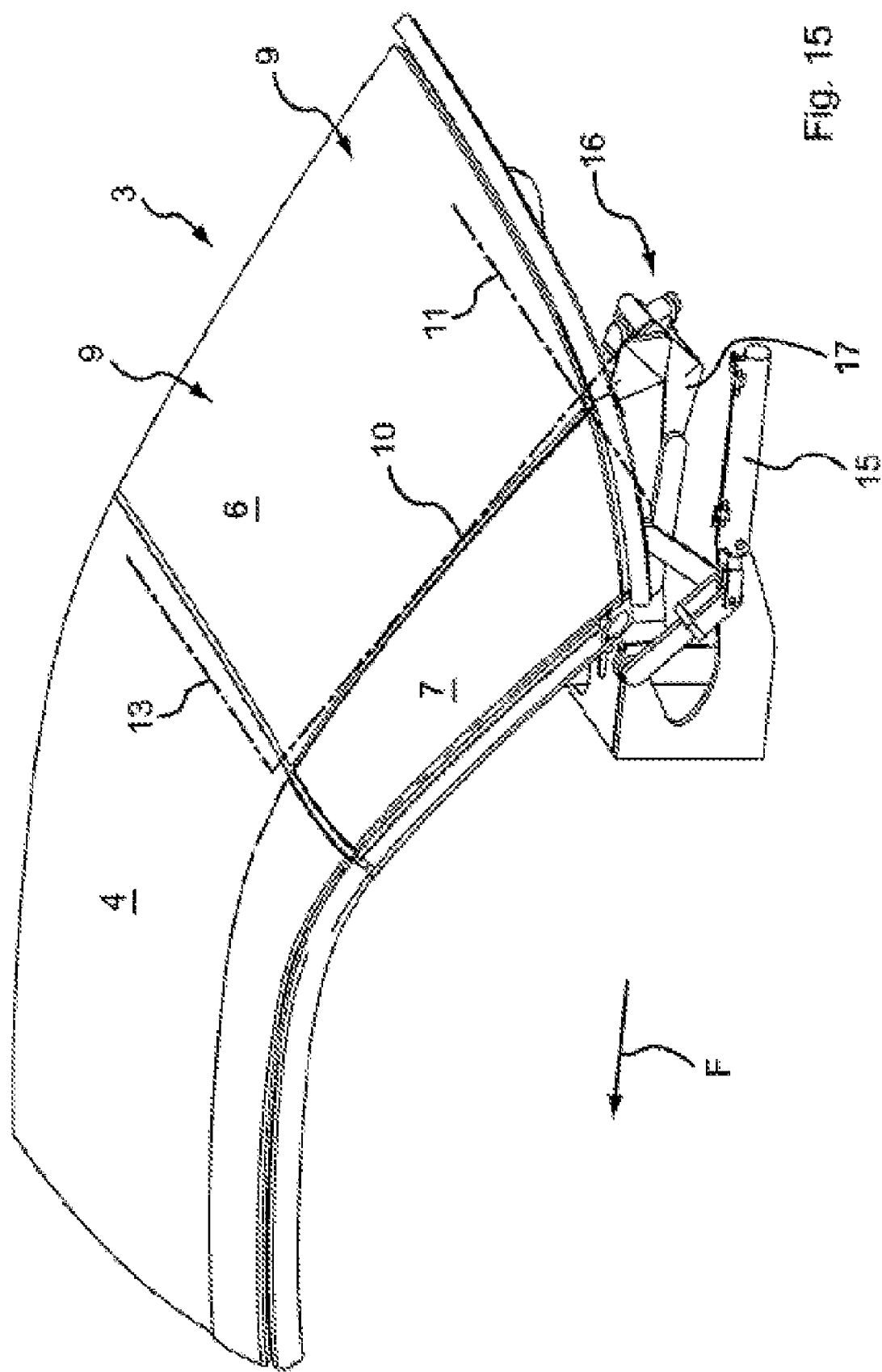
FIG. 15 is a view similar to FIG. 14, also showing the pivot axis of the C pillar and swivel axes of the rear roof element relative to the car body and of the roof elements relative to each other.
Figure 16:
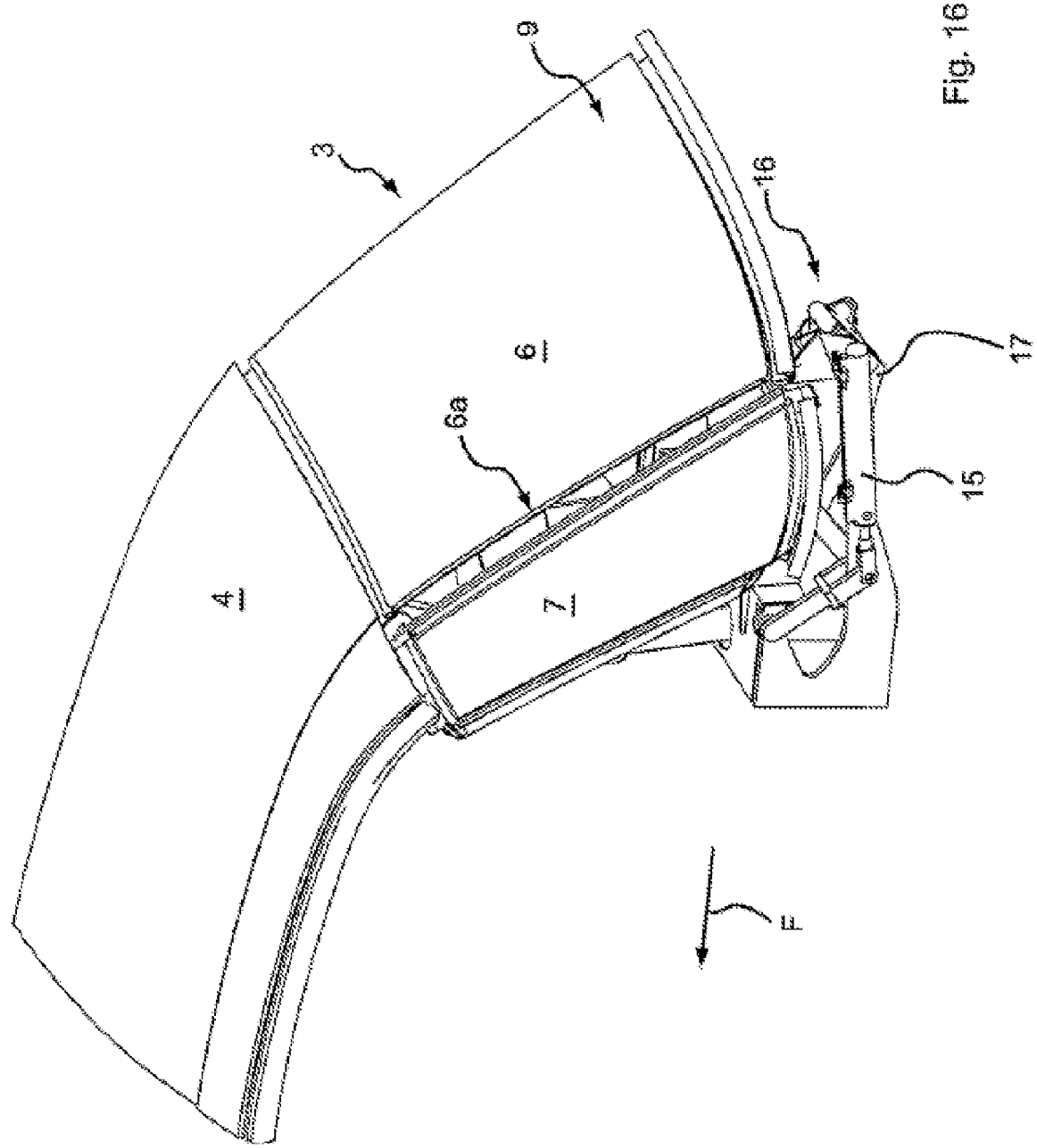
FIG. 16 is a view of the roof during its initial opening, somewhat corresponding to the position per FIG. 7.
Figure 17:
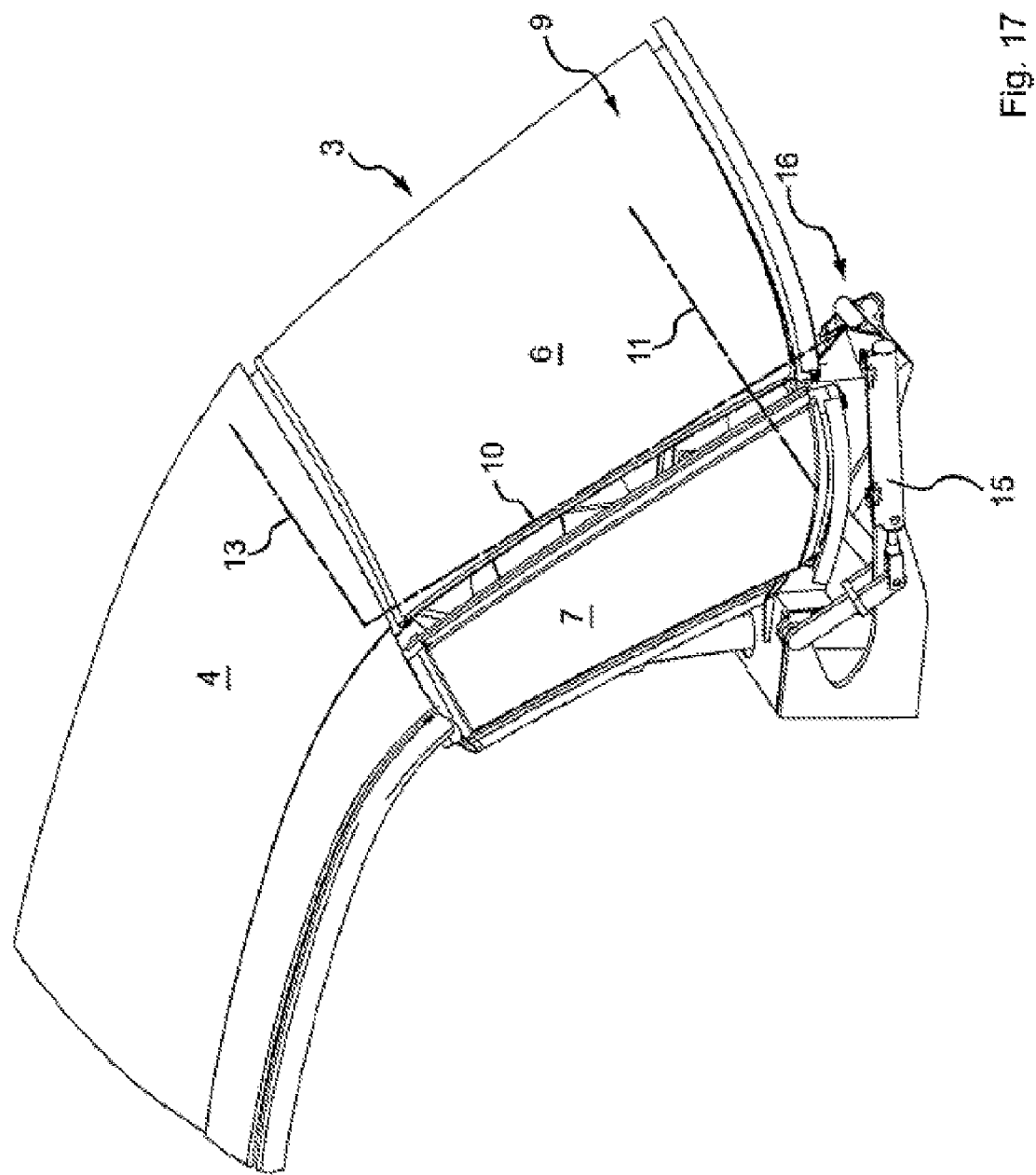
FIG. 17 is a view similar to FIG. 16, also showing the pivot axis of the C pillar and swivel axes of the rear roof element relative to the car body and of the roof elements relative to each other.
Figure 18:
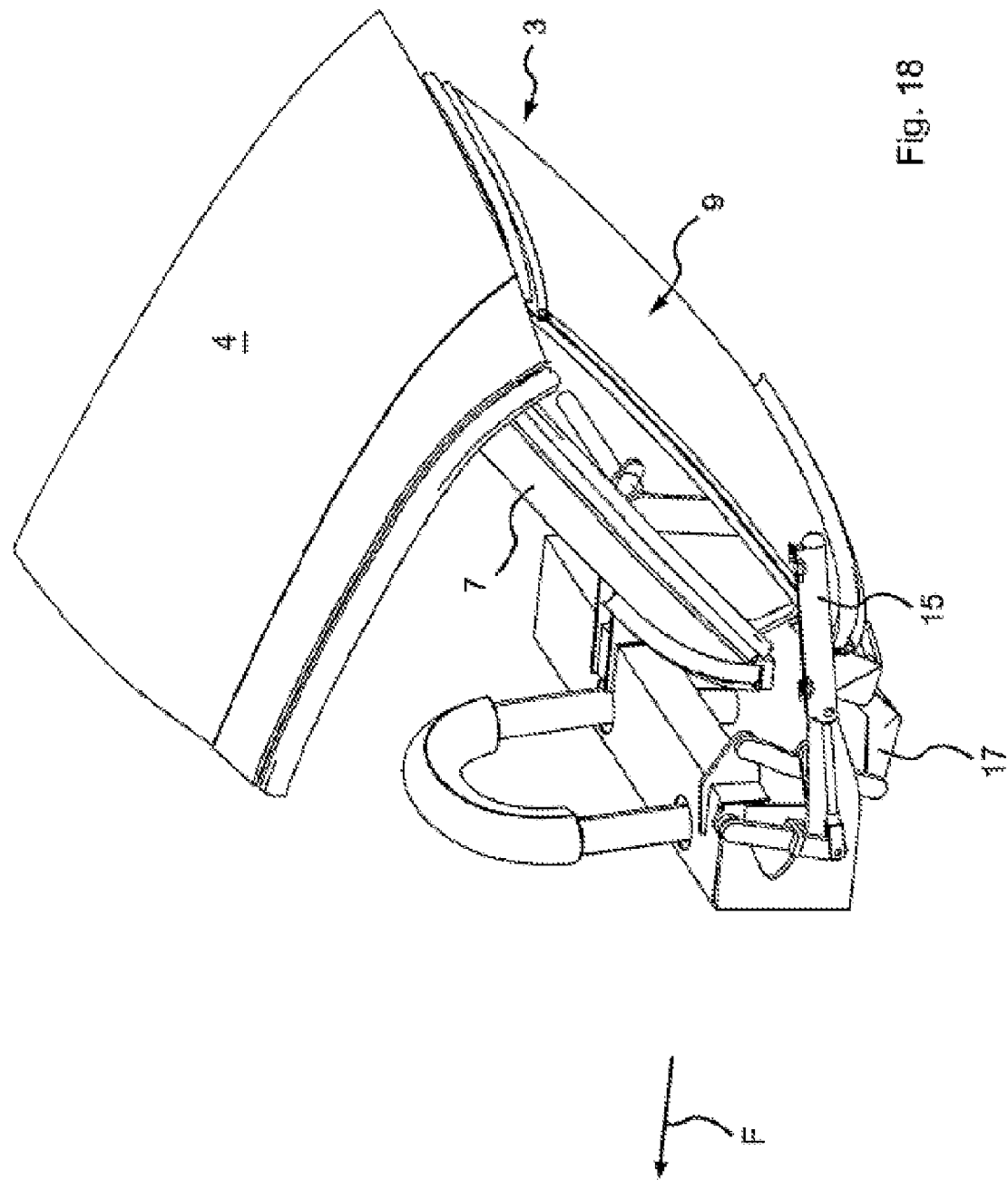
FIG. 18 is a view of the roof during its further opening, somewhat corresponding to the position per FIG. 9.
Figure 19:
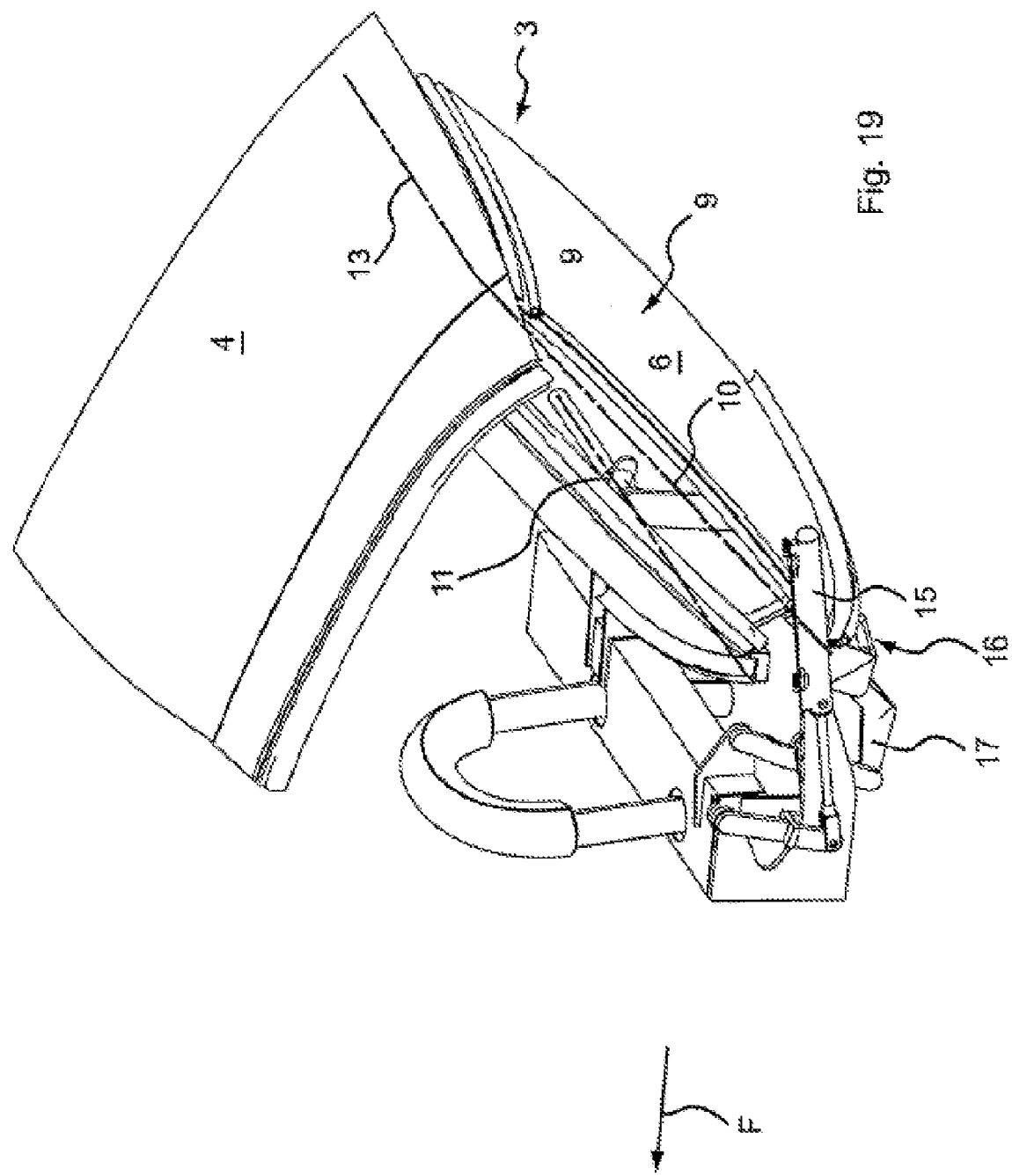
FIG. 19 is a view similar to FIG. 18, also showing the pivot axis of the C pillar and swivel axes of the rear roof element relative to the car body and of the roof elements relative to each other.
Figure 23A:
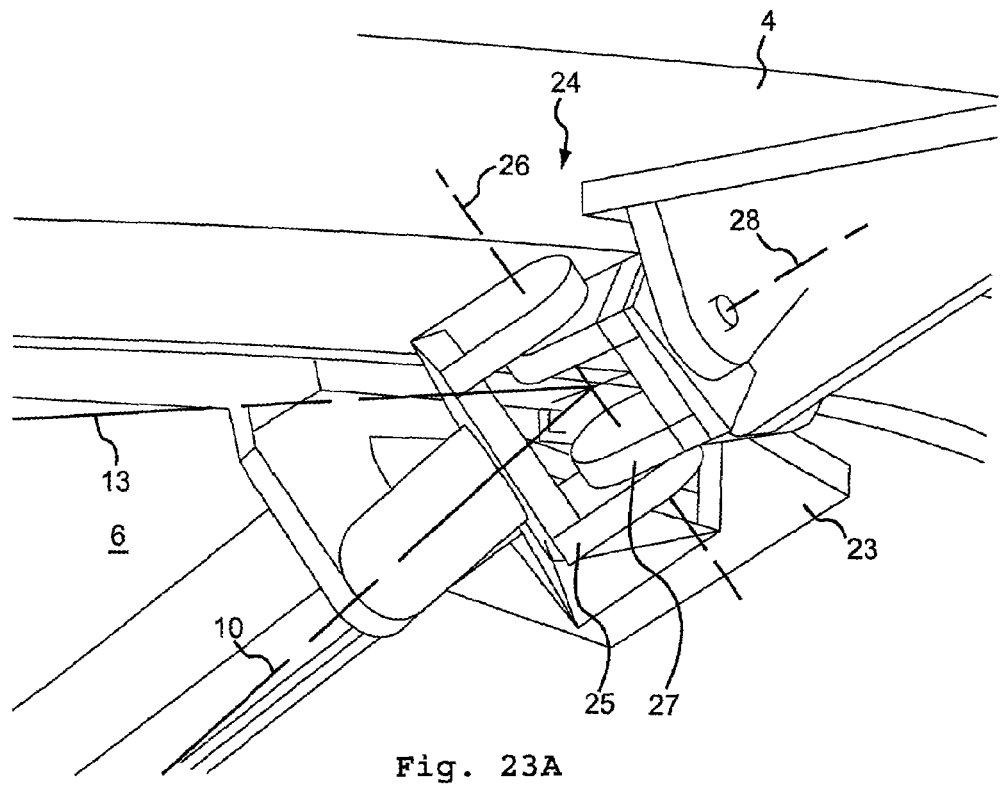
FIG. 23A and FIG. 23B are detail views of the upper and lower three-dimensional link mechanism in this position.
Figure 23B:
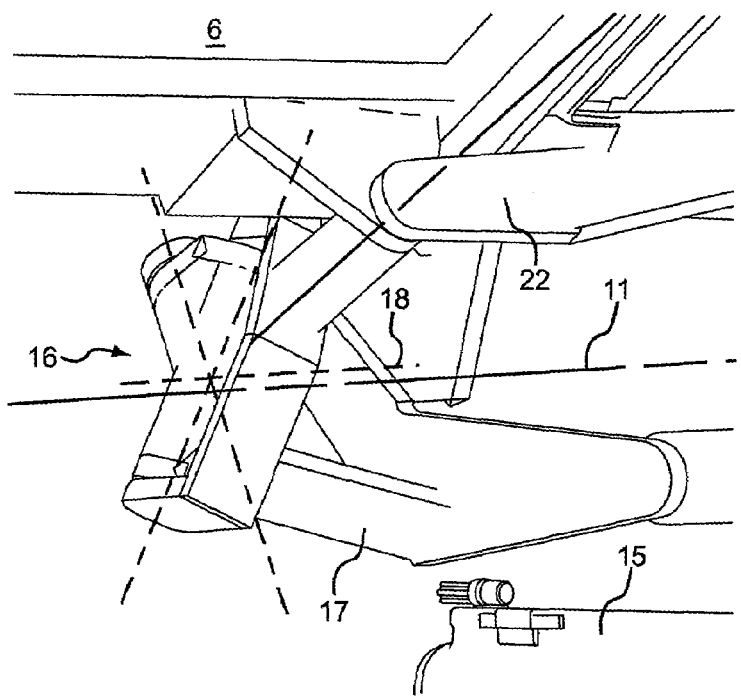
Figure 25A:
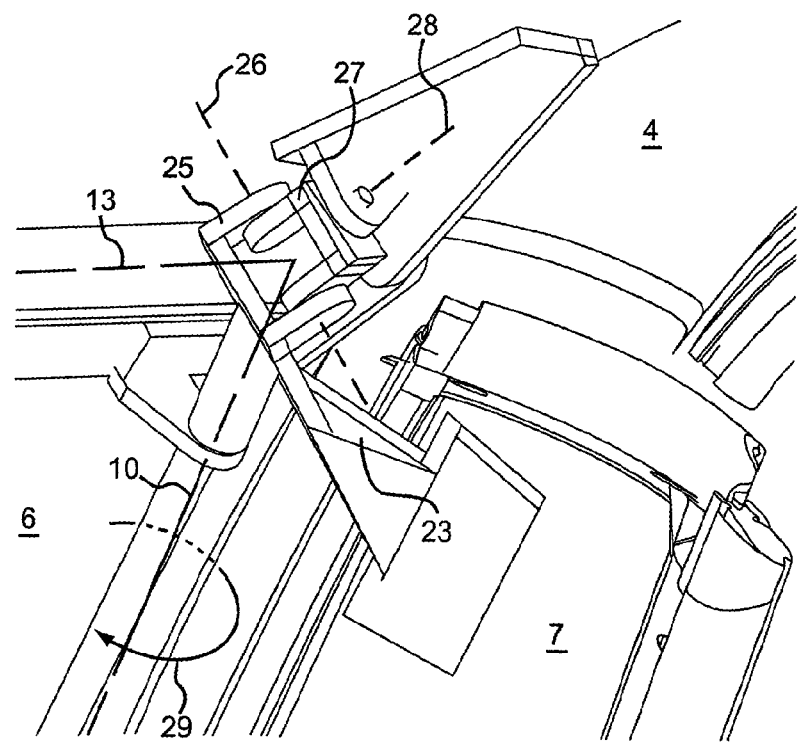
Figure 25B:
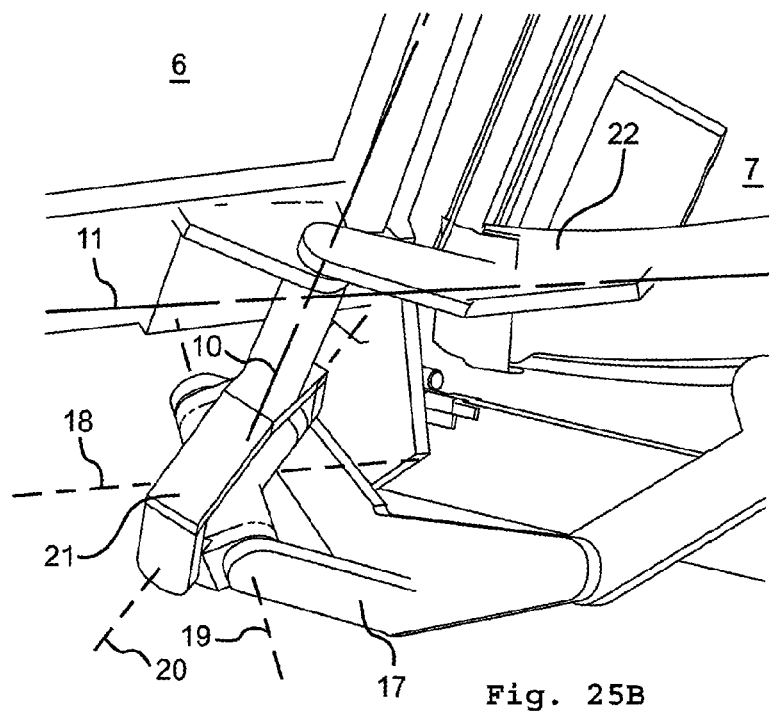
Figure 27A:
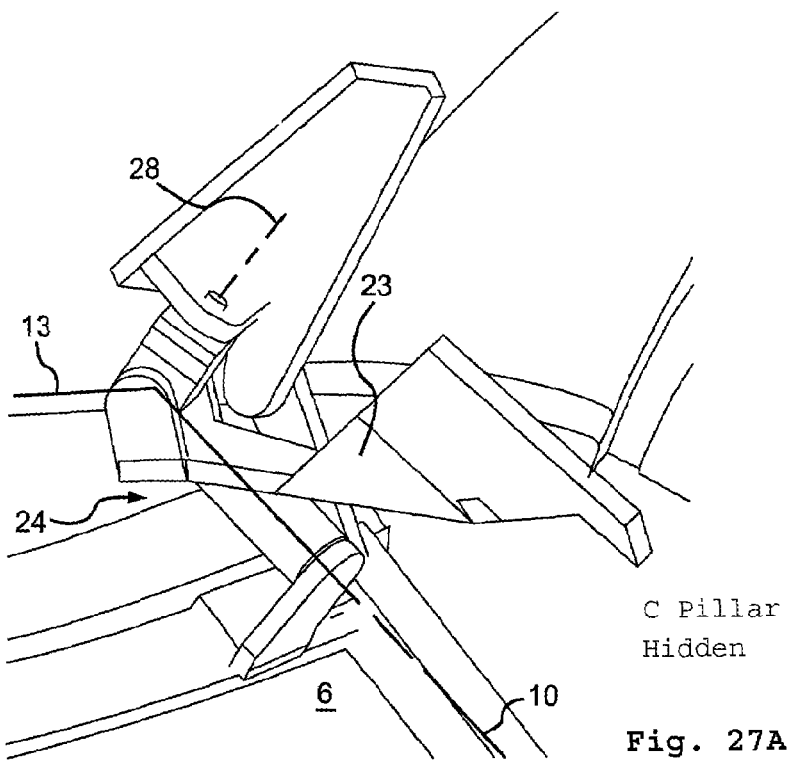
Figure 27B:
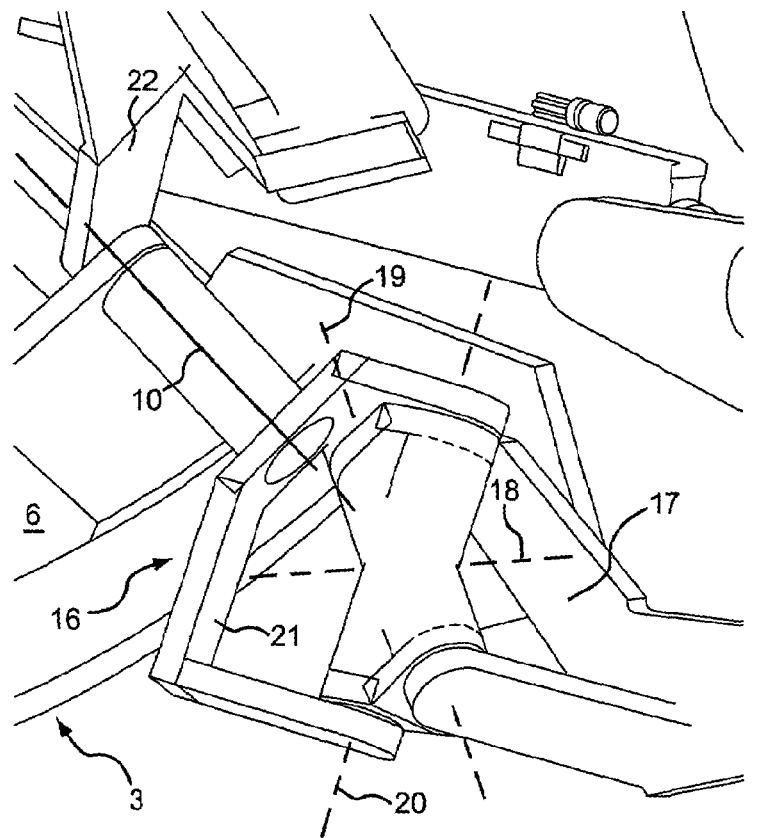
Figure 28:
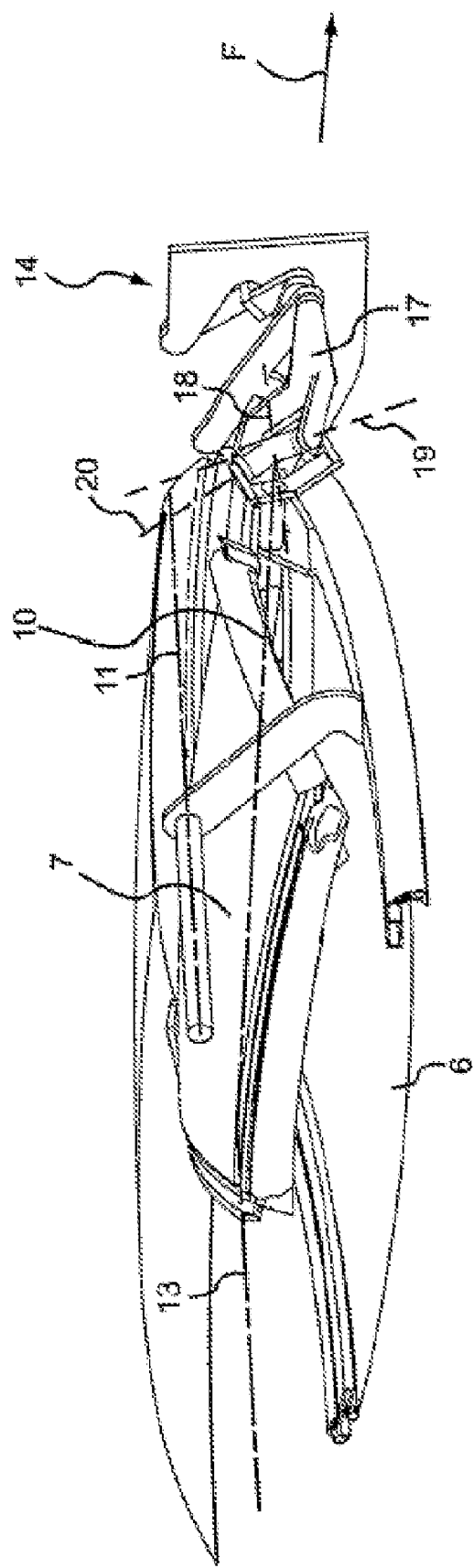
FIG. 28 is the roof, also showing the pivot axis of the C pillar and swivel axes of the rear roof element relative to the car body and of the roof elements relative to each other, in its opened position, somewhat corresponding to FIGS. 11 and 20, FIG. 29A and FIG. 29B are detail views of the upper and lower three-dimensional link mechanism in this position.
Figure 29A:
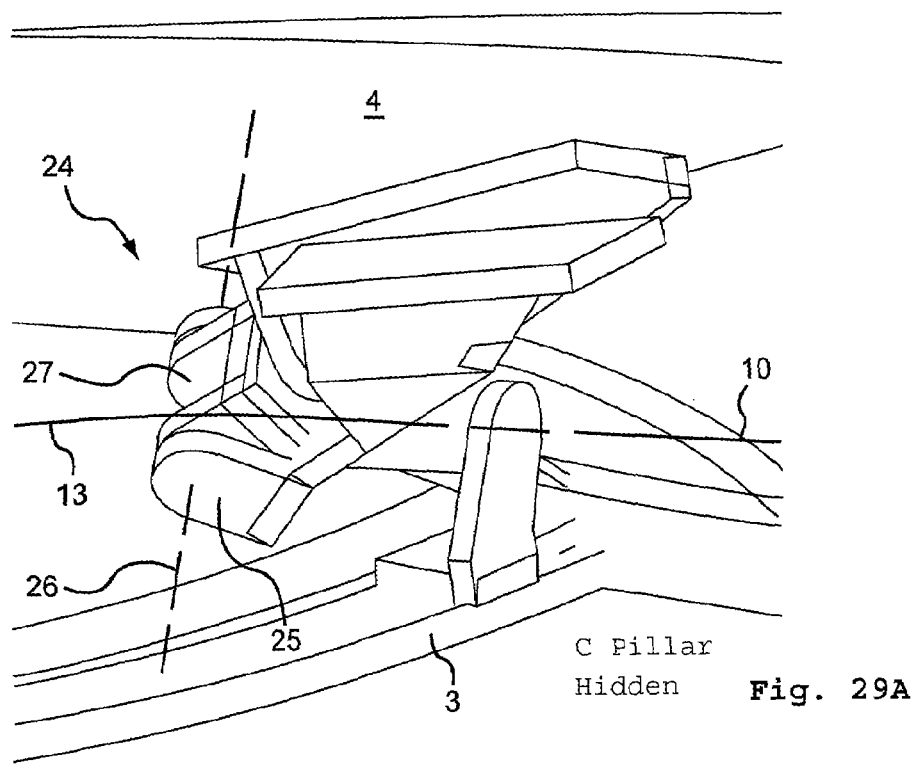
Figure 29B:
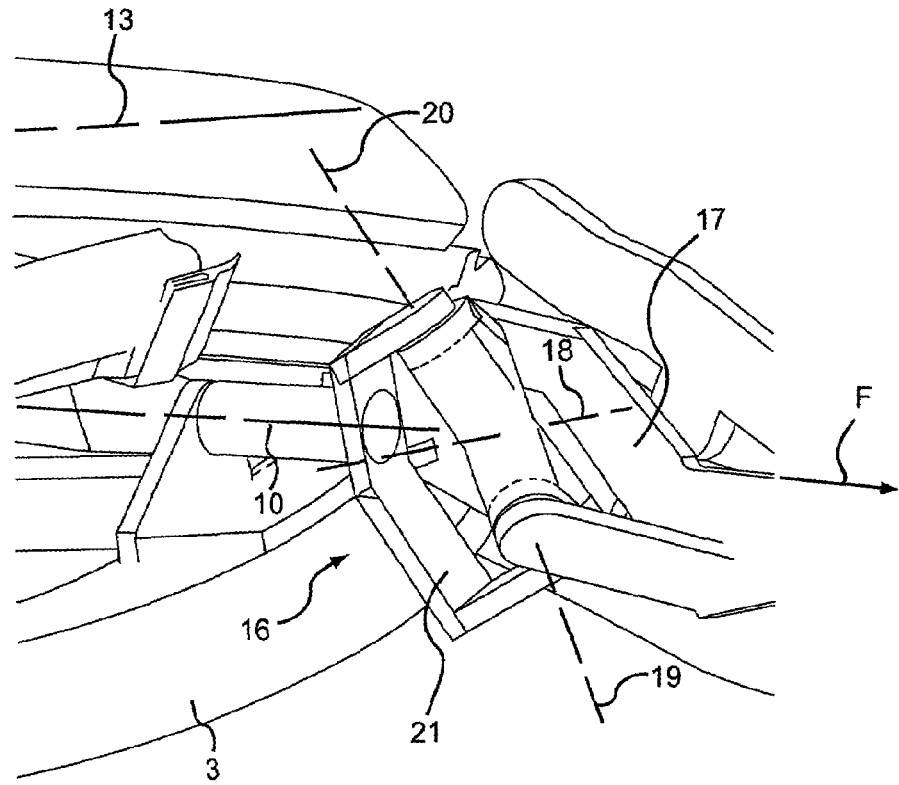

With the advantageous narrowing of the roof 2 by rotating the C pillars 7 inward during the opening, it is also possible to narrow the trunk cover D in any case. Now, its side edge no longer has to extend, as in the prior art, up to the joint R1 situated to the side outside of the entry gap for the C pillars, but rather it can end at the edge joint R2, moved closer to the center of the vehicle 8, leaving only a sufficient entry gap for the central segment 9 when the trunk cover D is open (FIG. 13), so that the design in the rear section is considerably improved.

The entire movable roof 2 can be tested for its function before being installed in the car being built; the ready installed modular unit can then be delivered to the car being built and connected to it merely by side-mounted main bearings 14.

The invention can be used both in vehicles with manually moved roofs and also especially in fully or partly automatic moving roofs 2.

While the best modes for carrying out the invention have been described in detail, those familiar with the art to which this invention relates will recognize various alternative designs and embodiments for practicing the invention within the scope of the appended claims.

The invention claimed is:

1. A convertible vehicle comprising:
    a roof (2) including a rear roof element (3) having a central segment (9), and a front roof element (4), with the front roof element (4) separated from the rear roof element (3) by a first transverse joint (5) and arranged one after the other relative to a direction of travel (F) when the rear roof element (3) and the front roof element (4) are positioned in a closed position, and the rear roof element (3) moveable at least essentially rearward and downward and the front roof element (4) swivelable toward the rear roof element (3) to move the rear roof element (3) and the front roof element (4) into an open position;
    a C pillar (7) coupled to the roof (2) and swivelable inward relative to the central segment (9); and
    a shaft (A) coupled to the C pillar (7) and configured for rotational movement;
    wherein rotational movement of the shaft (A) actuates a swivel movement of the C pillar (7) about a pivot axis (10) and actuates a swivel movement between the front roof element (4) and the rear roof element (3) about a horizontal swivel axis (13).

2. A convertible (1) per claim 1, characterized in that the shaft (A) lies parallel to the plane of the rear roof element (3).

3. A convertible vehicle (1) per claim 1, characterized in that an upper three-dimensional link mechanism (24) is arranged to translate the rotary movement of the shaft (A) into the swivel motion between the roof elements (3; 4).

4. A convertible vehicle (1) per claim 3, characterized in that a lower three-dimensional link mechanism (16) is provided to drive the rotary movement of the shaft (A), translating a displacement motion of the rear roof element (3) into the rotary motion of the shaft (A).

5. A convertible vehicle (1) per claim 4, characterized in that the upper and/or the lower three-dimensional link mechanism (24; 16) are each configured as a spherical link mechanism.

6. A convertible vehicle (1) per claim 5, characterized in that the upper and/or the lower three-dimensional link mechanism (24; 16) each have at least one universal joint.

7. A convertible vehicle (1) per claim 3, characterized in that the rear roof element (3) can swivel about a first axis (11) lying transverse to the vehicle (1) for its displacement, the front roof element (4) can swivel relative to the rear roof element about a second axis (13) lying parallel to the first axis (11), and the shaft (A) links both rotary movements.

8. A convertible vehicle (1) per claim 1, characterized in that a single drive (15) is provided for the movement of the rear roof element (3) about a first axis (11) lying transverse to the vehicle (1), the front roof element (4) about a second axis (13), and for the rotary movement of the shaft (A), which serves to produce the movement of the rear roof element (3) about a first axis (11) lying transverse to the vehicle (1).

9. A convertible vehicle (1) per claim 1, characterized in that similar structural relations exist on both sides of the vehicle.

10. A convertible vehicle (1) per claim 9, characterized in that the shafts (A) have bent right-angled ends (22; 23) and run from a middle portion of their dimension in the rear roof element into the C pillars (7) lying at the side of a rear windshield (6).

11. A convertible vehicle (1) per claim 10, characterized in that the C pillars (7) can swivel in relative to the rear windshield (6) by the rotary motion of the shafts (A) about their pivot axes (10) when the roof is opening and can be supported between the roof elements (3; 4) when the roof is in the open position.

* * * * *

UNITED STATES PATENT AND TRADEMARK OFFICE
CERTIFICATE OF CORRECTION

| | | |
|---|---|---|
| PATENT NO. | : 7,669,912 B2 | Page 1 of 1 |
| APPLICATION NO. | : 11/568577 | |
| DATED | : March 2, 2010 | |
| INVENTOR(S) | : Franz-Ulrich Brockhoff | |

It is certified that error appears in the above-identified patent and that said Letters Patent is hereby corrected as shown below:

Column 7, claim 2, the portion of line 39 reading "A convertible (1) per claim 1" should read "A convertible --vehicle-- (1) per claim 1".

Signed and Sealed this

Thirteenth Day of April, 2010

David J. Kappos
*Director of the United States Patent and Trademark Office*